United States Patent
Vajapeyam et al.

(10) Patent No.: US 11,019,656 B2
(45) Date of Patent: *May 25, 2021

(54) RANDOM ACCESS PROCEDURES UNDER COVERAGE LIMITATIONS

(71) Applicant: QUALCOMM Incorporated, San Diego, CA (US)

(72) Inventors: Madhavan Srinivasan Vajapeyam, San Diego, CA (US); Hao Xu, Beijing (CN); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/853,652

(22) Filed: Apr. 20, 2020

(65) Prior Publication Data

US 2020/0252962 A1 Aug. 6, 2020

Related U.S. Application Data

(63) Continuation of application No. 15/089,528, filed on Apr. 2, 2016, now Pat. No. 10,631,330.
(Continued)

(51) Int. Cl.
*H04L 12/28* (2006.01)
*H04W 74/00* (2009.01)
(Continued)

(52) U.S. Cl.
CPC ............. *H04W 74/006* (2013.01); *H04L 5/14* (2013.01); *H04W 24/08* (2013.01);
(Continued)

(58) Field of Classification Search
CPC ........... H04W 74/006; H04W 74/0833; H04W 24/08; H04W 72/042; H04W 72/085; H04L 5/14
(Continued)

(56) References Cited

U.S. PATENT DOCUMENTS 8,644,277 B2 2/2014 Zhang et al.
10,631,330 B2 4/2020 Vajapeyam et al.
(Continued)

FOREIGN PATENT DOCUMENTS

CN 103731854 A 4/2014
WO WO-2011017281 A1 2/2011
(Continued)

OTHER PUBLICATIONS

3GPP TS 36.321 V12.5.0, "3rd Generation Partnership Project; Technical Specification Group Radio Access Network; Evolved Universal Terrestrial Radio Access (E-UTRA); Medium Access Control (MAC) Protocol (Release 12)" Mar. 2015, pp. 68-69, Retrieved from Internet URL: http://www.3gpp.org/ftp/Specs/archive/36_series/36.321/36321-c50.zip . . . .
(Continued)

*Primary Examiner* — Mang Hang Yeung
(74) *Attorney, Agent, or Firm* — Qualcomm Incorporated

(57) ABSTRACT

Methods, systems, and devices for wireless communication are described. A user equipment (UE) may select a coverage enhancement (CE) level based on a coverage limitation. The UE may then receive system information from a base station indicating an index of CE levels and corresponding physical random access channel (PRACH) configurations, and the UE may transmit a random access preamble using the PRACH configuration for the selected CE level. For example, the UE may transmit the preamble based on a frequency offset that corresponds to the selected CE level. In
(Continued)

some cases, the UE and base station may also associate groups of preambles with downlink (DL) CE levels. The UE may select a preamble from a group corresponding to a desired DL CE level for a random access response message. The base station may determine the DL CE level based on the group the preamble was selected from and respond accordingly.

17 Claims, 24 Drawing Sheets

Related U.S. Application Data

(60) Provisional application No. 62/143,001, filed on Apr. 3, 2015.

(51) Int. Cl.
| | | |
|---|---|---|
| *H04W 74/08* | (2009.01) | |
| *H04L 5/14* | (2006.01) | |
| *H04W 24/08* | (2009.01) | |
| *H04W 72/04* | (2009.01) | |
| *H04W 72/08* | (2009.01) | |

(52) U.S. Cl.
CPC ....... *H04W 72/042* (2013.01); *H04W 72/085* (2013.01); *H04W 74/0833* (2013.01)

(58) Field of Classification Search
USPC .......................................................... 370/252
See application file for complete search history.

(56) References Cited

U.S. PATENT DOCUMENTS

| | | | |
|---|---|---|---|
| 2010/0067495 | A1 | 3/2010 | Lee et al. |
| 2010/0182992 | A1* | 7/2010 | Chun ............... H04W 56/0005 370/350 |
| 2010/0322096 | A1 | 12/2010 | Hsu et al. |
| 2011/0002262 | A1 | 1/2011 | Wang et al. |
| 2014/0161070 | A1 | 6/2014 | Chang et al. |
| 2015/0023324 | A1 | 1/2015 | Logalbo et al. |
| 2015/0215911 | A1 | 7/2015 | Dimou et al. |
| 2016/0192376 | A1 | 6/2016 | Lee et al. |
| 2016/0205661 | A1 | 7/2016 | Ryu et al. |
| 2016/0234787 | A1 | 8/2016 | Liu et al. |
| 2016/0262186 | A1 | 9/2016 | Lee et al. |
| 2016/0330768 | A1* | 11/2016 | Hu .................... H04W 74/0833 |
| 2016/0337991 | A1 | 11/2016 | Zhang et al. |
| 2016/0338110 | A1 | 11/2016 | Wang et al. |
| 2016/0353486 | A1 | 12/2016 | Xia et al. |
| 2017/0041960 | A1 | 2/2017 | Quan et al. |
| 2017/0105127 | A1 | 4/2017 | Xiong et al. |
| 2017/0238302 | A1 | 8/2017 | Futaki |
| 2017/0303064 | A1 | 10/2017 | Park et al. |
| 2017/0338877 | A1* | 11/2017 | Yum .................... H04B 17/318 |

FOREIGN PATENT DOCUMENTS

| | | |
|---|---|---|
| WO | WO-2015005701 A1 | 1/2015 |
| WO | WO-2015042866 A1 | 4/2015 |

OTHER PUBLICATIONS

Alcatel-Lucent, et al., "PRACH Coverage Enhancement for MTC UE", 3GPP Draft, 3GPP TSG-RAN WG1 Meeting #75,R1-135155- REL-12 MTC-Coverage Enhancement for Prach V0.2, 3rd Generation Partnership Project (3GPP), Mobile Competence Centre, 650, Route Des Lucioles, F-06921 Sophia-Antipolis Cedex, vol. RAN WG1, no. San Francisco, USA, Nov. 11, 2013-Nov. 15, 2013, Nov. 13, 2013 (Nov. 13, 2013), XP050734855, 8 Pages, Retrieved from the Internet: URL: http://www.3gpp.org/ftp/Meetings_3GPP_SYNC/RAN/RAN1/Docs/ [retrieved on Nov. 13, 2013] the whole document.

Huawei, et al., "Discussion on PRACH Coverage Improvement and Mechanism for Determining the Amount of Needed Coverage Improvement", 3GPP Draft, 3GPP TSG RAN WG1 Meeting #74bis, R1-134054, 3rd Generation Partnership Project (3GPP), Mobile Competence Centre, 650, Route Des Lucioles, F-06921 Sophia-Antipolis Cedex, France, vol. RAN WG1, no. Guangzhou, China, Oct. 7, 2013-Oct. 11, 2013, Sep. 28, 2013 (Sep. 28, 2013), XP050717246, 6 Pages, Retrieved from the Internet: URL: http://www.3gpp.org/ftp/tsg_ran/WG1_RL1/TSGR1_74b/Docs/ [retrieved on Sep. 28, 2013] the whole document.

Huawei et al., "Discussion on the Power Ramping for PRACH Coverage Enhancement", 3GPP Draft; 3GPP TSG RAN WG1 Meeting #80, R1-150397, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 9, 2015-Feb. 13, 2015, Feb. 8, 2015 (Feb. 8, 2015), XP050933607, 4 Pages, Retrieved from the Internet: URL:https://www.3gpp.org/ftp/Meetings_3GPP_SYNC/RAN1/Docs/[retrieved on Feb. 8, 2015].

International Search Report and Written Opinion—PCT/US2016/025797—ISA/EPO—dated Jun. 17, 2016 (152892WO).

LG Electronics: "RACH Procedure for Coverage Enhancement of MTC UEs", 3GPP Draft, 3GPP TSG RAN WG1 Meeting #74bis,R1-134393 MTC_RACH for CE (Final), 3rd Generation Partnership Project (3GPP), Mobile Competence Centre, 650, Route Des Lucioles, F-06921, Sophia-Antipolis, France, vol. RAN WG1, no. Guangzhou, China, Oct. 7, 2013-Oct. 11, 2013, Sep. 28, 2013 (Sep. 28, 2013), XP050717518, 3 Pages, Retrieved from the Internet: URL: http://www.3gpp.org/ftp/tsg_ran/WG1_RL1/TSGR1_74b/Docs/ [retrieved on Sep. 28, 2013] the whole document.

NSN, Nokia: "PRACH Enhancement and Mechanism for Identifying Coverage Shortfall", 3GPP TSG-RAN WG1#74bis, R1-134517, Sep. 28, 2013, 6 Pages, Retrieved from Internet URL: http://www.3gpp.org/ftp/tsg_ran/WG1_RL1/TSGR1_74b/Docs/R1-134517.zip . . . .

Taiwan Search Report—TW105110798—TIPO—dated May 8, 2020 (152892TW).

ZTE: "Physical Random Access Channel Coverage Enhancement", 3GPP Draft, 3GPP TSG RAN WG1 Meeting #74b,R1-134303—Physical Random Access Channel Coverage Enhancement, 3rd Generation Partnership Project (3GPP), Mobile Competence Centre, 650, Route Des Lucioles, F-06921 Sophia-Antipolis, CED, vol. RAN WG1, no. Guangzhou, China, Oct. 7, 2013-Oct. 11, 2013, Sep. 28, 2013 (Sep. 28, 2013), XP050717447, 16 Pages, Retrieved from the Internet: URL: http://www.3gpp.org/ftp/tsg_ran/WG1_RL1/TSGR1_74b/Docs/ [retrieved on Sep. 28, 2013] the whole document.

SHARP: "PRACH Coverage Enhancement for Rel-13 MTC UEs", 3GPP TSG-RAN WG1 #80, R1-150275, 3RD Generation Partnership Project (3GPP), Mobile Competence Centre, 650, Route Des Lucioles, F-06921, Sophia-Antipolis Cedex, France, vol. RAN WG1, No. Athens, Greece, Feb. 9, 2015-Feb. 13, 2015, Feb. 8, 2015 (Feb. 8, 2015), XP050933485, pp. 1-5, Retrieved from the Internet:URL: http://www.3gpp.org/ftp/Meetings_3GPP_SYNC/RAN1/Docs/ [retrieved on Feb. 8, 2015].

* cited by examiner

RANDOM ACCESS PROCEDURES UNDER COVERAGE LIMITATIONS

CLAIM OF PRIORITY UNDER 35 U.S.C. § 120

The present application is a continuation of U.S. application Ser. No. 15/089,528, filed Apr. 2, 2016, entitled "RANDOM ACCESS PROCEDURES UNDER COVERAGE LIMITATIONS," which claims priority to and benefit of U.S. Provisional Patent Application Ser. No. 62/143,001, filed Apr. 3, 2015, entitled "RANDOM ACCESS PROCEDURES UNDER COVERAGE LIMITATIONS," each of which is herein incorporated by reference in its entirety as if fully set forth below and for all applicable purposes.

BACKGROUND

The following relates generally to wireless communication, and more specifically to random access procedures under coverage limitations.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

In some cases, a UE—e.g., a machine type communications (MTC) device or a low complexity wireless device—may communicate with a wireless network using coverage enhancement (CE) techniques such as increased repetition of information. This may enable a UE to improve the reliability of a communication link. However, a UE using CE techniques may not be coordinated with the network regarding which CE level or configuration will be used prior to performing an access procedure. This may result in less reliable communications during the access procedure, which may cause disruptions or delay in the establishing the communication link.

SUMMARY

A user equipment (UE) may select a coverage enhancement (CE) level based on a coverage limitation such as a channel condition or UE category. The UE may then receive system information from a base station indicating an index of CE levels and corresponding physical random access channel (PRACH) configurations, and transmit a random access preamble according to the PRACH configuration for the selected CE level. For example, the UE may transmit the preamble based on a frequency offset that corresponds to the selected CE level. In some cases, the UE and base station may also associate groups of preambles with downlink (DL) CE levels. The UE may select a preamble from a group corresponding to a desired DL CE level for a random access response (RAR) message. The base station may determine the DL CE level based on the group the preamble was selected from and respond accordingly.

A method of wireless communication is described. The method may include receiving signaling indicative of a set of PRACH configurations, wherein each PRACH configuration of the set corresponds to a coverage enhancement level supported by a base station, selecting one of the CE levels based at least in part on a coverage limitation, and transmitting a random access message according to a PRACH configuration corresponding to the selected CE level.

An apparatus for wireless communication is described. The apparatus may include means for receiving signaling indicative of a set of PRACH configurations, wherein each PRACH configuration of the set corresponds to a coverage enhancement level supported by a base station, means for selecting one of the CE levels based at least in part on a coverage limitation, and means for transmitting a random access message according to a PRACH configuration corresponding to the selected CE level.

A further apparatus for wireless communication is described. The apparatus may include a processor, memory in electronic communication with the processor, and instructions stored in the memory and operable, when executed by the processor, to cause the apparatus to receive signaling indicative of a set of PRACH configurations, wherein each PRACH configuration of the set corresponds to a coverage enhancement level supported by a base station, select one of the CE levels based at least in part on a coverage limitation, and transmit a random access message according to a PRACH configuration corresponding to the selected CE level.

A non-transitory computer-readable medium storing code for wireless communication is described. The code may include instructions executable to receive signaling indicative of a set of PRACH configurations, wherein each PRACH configuration of the set corresponds to a coverage enhancement level supported by a base station, select one of the CE levels based at least in part on a coverage limitation, and transmit a random access message according to a PRACH configuration corresponding to the selected CE level.

Some examples of the method, apparatuses, or non-transitory computer-readable medium described herein may further include processes, features, means, or instructions for receiving signaling indicative of one or more coverage limitation thresholds from a base station, and determining the coverage limitation based at least in part on the received coverage limitation thresholds. Additionally or alternatively, in some examples the coverage limitation thresholds comprise at least one of a link budget, a path loss threshold, a reference signal received power (RSRP) threshold, or an initial PRACH target power, or any combination thereof.

Some examples of the method, apparatuses, or non-transitory computer-readable medium described herein may further include processes, features, means, or instructions for selecting a preamble format for the random access message based at least in part on the coverage limitation. Additionally or alternatively, in some examples the selecting the CE level is based at least in part on the selected preamble format.

Some examples of the method, apparatuses, or non-transitory computer-readable medium described herein may further include processes, features, means, or instructions for estimating a DL CE level based at least in part on explicit signaling from a base station, a comparison between a downlink signal measurement and a DL signal threshold, the selected coverage enhancement level, or any combination thereof, wherein the selected preamble format is indicative of the estimated DL CE level. The DL signal threshold may be determined based on a reference DL transmission format. Additionally or alternatively, some examples may include processes, features, means, or instructions for determining one or more resources for receiving a RAR based at least in part on the estimated DL CE level, and monitoring the one or more resources for the RAR.

Some examples of the method, apparatuses, or non-transitory computer-readable medium described herein may further include processes, features, means, or instructions for selecting a subsequent CE level based at least in part on an unsuccessful random access transmission, and reestimating an estimated DL CE level based at least in part on selecting the subsequent CE level. Additionally or alternatively, some examples may include processes, features, means, or instructions for receiving a RAR, and decoding the RAR based at least in part on the estimated DL CE level. Some examples may include decoding a control portion of the RAR based at least in part on an estimated DL CE level, identifying an indicated CE level based at least in part on the control portion of the RAR, and decoding a data portion of the RAR based at least in part on the indicated CE level.

Some examples of the method, apparatuses, or non-transitory computer-readable medium described herein may further include processes, features, means, or instructions for selecting resources for transmitting the random access message based at least in part on the PRACH configuration, and monitoring one or more pre-defined time intervals for receiving a RAR based at least in part on the selected resources. Additionally or alternatively, some examples may include processes, features, means, or instructions for selecting resources for transmitting the random access message based at least in part on the PRACH configuration, monitoring one or more pre-defined time intervals for receiving a RAR control message based at least in part on the selected resources, and receiving a RAR based at least in part on the RAR control message.

In some cases, the DL signal threshold is determined based on a reference DL transmission format. In some cases, the one or more pre-defined time intervals for monitoring are determined based on broadcast signaling. In some cases, the one or more pre-defined time intervals for monitoring is based on the selected preamble format of the random access message. In some cases, the one or more pre-defined time intervals for monitoring is based at least in part on a CE level of the selected preamble format of the random access message. In some cases, the methods described may further include receiving an indication in a RAR to continue monitoring for one or more further response messages.

Some examples of the method, apparatuses, or non-transitory computer-readable medium described herein may further include processes, features, means, or instructions for determining a target transmit power for the random access message based at least in part on the PRACH configuration, a selected preamble format, a prior transmission count, or any combination thereof. Additionally or alternatively, in some examples the selecting the CE level is based at least in part on a counter of prior PRACH transmissions.

Some examples of the method, apparatuses, or non-transitory computer-readable medium described herein may further include processes, features, means, or instructions for selecting a candidate CE level of the one or more CE levels supported by the base station, determining a candidate transmit power for the random access message, determining that the candidate transmit power exceeds a transmit power threshold, and the selection of the CE level is based at least in part on determining that the candidate transmit power exceeds the transmit power threshold, wherein the CE level is higher than the candidate CE level. Additionally or alternatively, some examples may include processes, features, means, or instructions for receiving signaling indicative of a CE level from a base station, wherein the selected CE level corresponds to the CE level indicated by the base station.

In some examples of the method, apparatuses, or non-transitory computer-readable medium described herein, the signaling from the base station comprises a PRACH mask index or a frequency offset, or both. Additionally or alternatively, in some examples the set of PRACH configurations comprises a set of PRACH configurations for frequency division duplex (FDD) operation or a set of PRACH configurations for time division duplex (TDD) operation, or both.

In some examples of the method, apparatuses, or non-transitory computer-readable medium described herein, the set of PRACH configurations comprises a set of deterministic values for each supported CE level. Additionally or alternatively, in some examples the set of PRACH configurations comprises a PRACH frequency offset corresponding to each supported CE level.

Some examples of the method, apparatuses, or non-transitory computer-readable medium described herein may further include processes, features, means, or instructions for identifying a default PRACH configuration based at least in part on a UE type, wherein the random access message is transmitted according to the default PRACH configuration. Additionally or alternatively, in some examples the UE type comprises at least one of a UE category or a previously configured UE, or both.

In some examples of the method, apparatuses, or non-transitory computer-readable medium described herein, the set of PRACH configurations comprise designated resources that are frequency division multiplexing (FDM) or time division multiplexing (TDM), or both, over a plurality of resource blocks. Additionally or alternatively, in some examples the received signaling comprises at least one of a starting subframe index, a PRACH periodicity, a PRACH offset, a time duration, or a frequency offset, or any combination thereof.

Some examples of the method, apparatuses, or non-transitory computer-readable medium described herein may further include processes, features, means, or instructions for initiating a random access transmission counter upon transmitting the random access message, selecting a subsequent CE level based at least in part on an unsuccessful random access transmission, and resetting the random access transmission counter based at least in part on selecting the subsequent CE level. Additionally or alternatively, some examples may include processes, features, means, or instructions for declaring a radio link failure based at least in part on a threshold number of unsuccessful random access transmissions, wherein the set of PRACH configurations comprise the threshold.

Some examples of the method, apparatuses, or non-transitory computer-readable medium described herein may further include processes, features, means, or instructions for transmitting a connection message, wherein the connection message comprises at least one of a connection request message, a connection reestablishment message and a handover complete message, based at least in part on a configuration indicated in a received random access response. Additionally or alternatively, some examples may include processes, features, means, or instructions for monitoring a control channel for a retransmission indication of the connection message based at least in part on a configuration indicated in a received random access response. Additionally or alternatively, some examples may include processes, features, means, or instructions for transmitting a connection request message based at least in part on a configuration indicated in a received RAR.

Some examples of the method, apparatuses, or non-transitory computer-readable medium described herein may further include processes, features, means, or instructions for retransmitting the connection message until at least one of receiving contention resolution message, exceeding a threshold number of retransmission attempts, or expiry of a contention resolution timer, or any combination thereof. Additionally or alternatively, in some examples the contention resolution timer is configured based at least in part on the selected CE level.

A further method of wireless communication is described. The method may include receiving signaling that indicates a mapping between an estimated downlink (DL) coverage enhancement (CE) level and a random access group, selecting the random access group based at least in part on the mapping, and transmitting a random access message based at least in part on the selected random access group.

An apparatus for wireless communication is described. The apparatus may include means for receiving signaling that indicates a mapping between an estimated downlink (DL) coverage enhancement (CE) level and a random access group, means for selecting the random access group based at least in part on the mapping, and means for transmitting a random access message based at least in part on the selected random access group.

A further apparatus for wireless communication is described. The apparatus may include a processor, memory in electronic communication with the processor, and instructions stored in the memory and operable, when executed by the processor, to cause the apparatus to receive signaling that indicates a mapping between an estimated downlink (DL) coverage enhancement (CE) level and a random access group, select the random access group based at least in part on the mapping, and transmit a random access message based at least in part on the selected random access group.

A non-transitory computer-readable medium storing code for wireless communication is described. The code may include instructions executable to receive signaling that indicates a mapping between an estimated downlink (DL) coverage enhancement (CE) level and a random access group, select the random access group based at least in part on the mapping, and transmit a random access message based at least in part on the selected random access group.

Some examples of the method, apparatuses, or non-transitory computer-readable medium described herein may further include processes, features, means, or instructions for determining a frequency resource for a RAR based at least in part on the selected random access group. Additionally or alternatively, in some examples the random access group indicates control information associated with the RAR, and wherein the determined frequency resource comprises a control message.

In some examples of the method, apparatuses, or non-transitory computer-readable medium described herein, the random access group indicates control information and data information associated with the RAR, and wherein the determined frequency resource comprises a control message or a data message, or both. Additionally or alternatively, some examples may include processes, features, means, or instructions for determining a random access radio network temporary identifier (RA-RNTI) based at least in part on the selected random access group.

A method of wireless communication is described. The method may include transmitting signaling indicative of a set of physical random access channel (PRACH) configurations, wherein each PRACH configuration of the set corresponds to a supported coverage enhancement level, and receiving a random access message according to a PRACH configuration of the set of PRACH configurations.

An apparatus for wireless communication is described. The apparatus may include means for transmitting signaling indicative of a set of physical random access channel (PRACH) configurations, wherein each PRACH configuration of the set corresponds to a supported coverage enhancement level, and means for receiving a random access message according to a PRACH configuration of the set of PRACH configurations.

A further apparatus for wireless communication is described. The apparatus may include a processor, memory in electronic communication with the processor, and instructions stored in the memory and operable, when executed by the processor, to cause the apparatus to transmit signaling indicative of a set of physical random access channel (PRACH) configurations, wherein each PRACH configuration of the set corresponds to a supported coverage enhancement level, and receive a random access message according to a PRACH configuration of the set of PRACH configurations.

A non-transitory computer-readable medium storing code for wireless communication is described. The code may include instructions executable to transmit signaling indicative of a set of physical random access channel (PRACH) configurations, wherein each PRACH configuration of the set corresponds to a supported coverage enhancement level, and receive a random access message according to a PRACH configuration of the set of PRACH configurations.

Some examples of the method, apparatuses, or non-transitory computer-readable medium described herein may further include processes, features, means, or instructions for transmitting signaling indicative of one or more coverage limitation thresholds, wherein the random access message is received based at least in part on the signaling. Some examples may include transmitting a random access response based at least in part on the random access message. Some examples may include transmitting an indication in a random access response to continue monitoring for one or more further response messages.

Some examples of the method, apparatuses, or non-transitory computer-readable medium described herein may further include processes, features, means, or instructions for selecting resources for transmitting a random access response based at least in part on the PRACH configuration, and transmitting the random access response using the selected resources. Some examples may include transmitting signaling indicative of a CE level, wherein the random access message is received based at least in part on the CE level.

A method of wireless communication is described. The method may include transmitting signaling that indicates a mapping between a downlink (DL) coverage enhancement (CE) level and a random access group, receiving a random access message based at least in part on the random access group, and determining a DL CE level based at least in part on the random access group of the received random access message.

An apparatus for wireless communication is described. The apparatus may include means for transmitting signaling that indicates a mapping between a downlink (DL) coverage enhancement (CE) level and a random access group, means for receiving a random access message based at least in part on the random access group, and means for determining a DL CE level based at least in part on the random access group of the received random access message.

A further apparatus for wireless communication is described. The apparatus may include a processor, memory in electronic communication with the processor, and instructions stored in the memory and operable, when executed by the processor, to cause the apparatus to transmit signaling that indicates a mapping between a downlink (DL) coverage enhancement (CE) level and a random access group, receive a random access message based at least in part on the random access group, and determine a DL CE level based at least in part on the random access group of the received random access message.

A non-transitory computer-readable medium storing code for wireless communication is described. The code may include instructions executable to transmit signaling that indicates a mapping between a downlink (DL) coverage enhancement (CE) level and a random access group, receive a random access message based at least in part on the random access group, and determine a DL CE level based at least in part on the random access group of the received random access message.

BRIEF DESCRIPTION OF THE DRAWINGS

Aspects of the disclosure are described in reference to the following figures.

DETAILED DESCRIPTION

A user equipment (UE), such as a machine type communications (MTC) device or a low complexity wireless device, may communicate with a wireless network using coverage enhancement (CE) techniques. Random access channel (RACH) procedures may be performed differently depending on the CE technique or CE level employed. The various messages exchanged during a RACH procedure may use specific CE techniques, CE levels, or resources. For example, a UE may transmit a preamble (RACH message 1) on different time or frequency resources depending on a CE level the UE is using. Likewise, a base station may utilize different time or frequency resources for a random access response (RAR) to the UE depending on a downlink (DL) CE level employed by the base station. Furthermore, a RAR intended for the UE may be transmitted according to various levels of bundling or repetition. The PRACH procedure may further include transmissions that employ power and CE level ramp-up techniques. A RACH message 2 (i.e., RAR message) may include a scheduling procedure, a CE level determination, a RA-RNTI determination, and a response window. A RACH message 3, (i.e., RRC connection setup) may include asynchronous HARQ support and contention resolution. The reliability and likelihood of successful communication of such RACH messages may be increased when the UE and base station are coordinated with respect to techniques and resources being employed for these messages.

PRACH resources may be signaled using a PRACH configuration index list for MTC devices. In some cases, the PRACH configuration index list may be broadcast in an MTC system information block (SIB). The UE may determine the PRACH CE level and select a PRACH configuration index based on the CE level form the PRACH configuration index list. A UE may also determine a PRACH CE and transmit power level together.

In some cases, a downlink (DL) CE level and an uplink (UL) CE level may be different depending on channel conditions. A UE may thus attempt to select or determine the DL CE level and resources that base station will use for the RAR. The UE may, for example, estimate an appropriate DL CE level and indicate the level by its random access preamble.

RAR scheduling may be accomplished in one of several ways. The response may be dynamically scheduled, it RAR may only occur on pre-determined resources or control may be sent on fixed resources, but the control may dynamically schedule the data resource for the RAR.

Aspects of the disclosure are initially described in the context of a wireless communication system. Specific examples are then described for a preamble resource offset configuration and several RAR scheduling configurations. These and other aspects of the disclosure are further illustrated by and described with reference to apparatus diagrams, system diagrams, and flowcharts that relate to random access procedures under coverage limitations.

Figure 1:
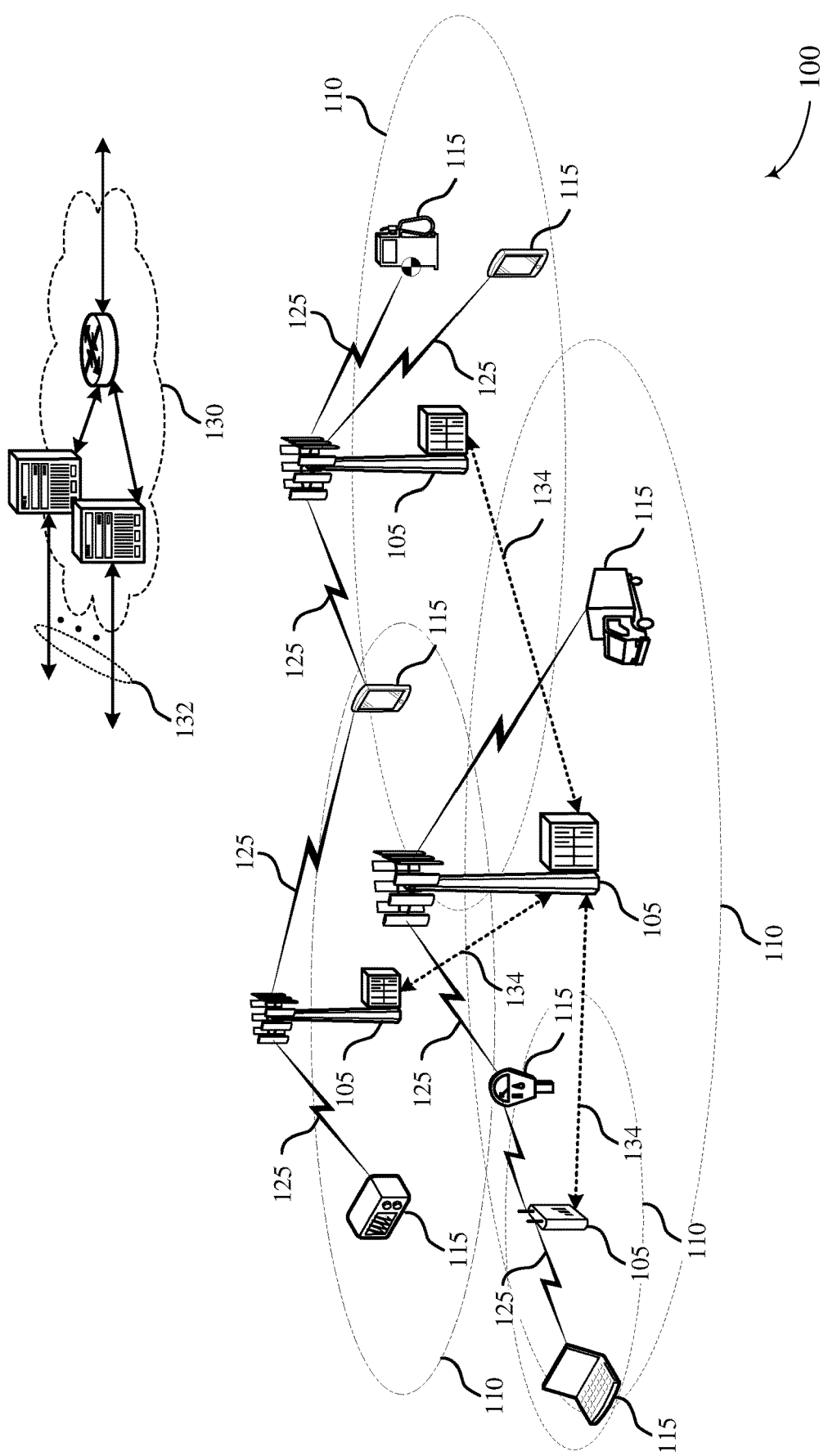
FIG. 1 illustrates an example of a wireless communications system that supports random access procedures under coverage limitations in accordance with various aspects of the present disclosure.

FIG. 1 illustrates an example of a wireless communications system 100 in accordance with various aspects of the present disclosure. The wireless communications system 100 includes base stations 105, user equipment (UEs) 115, and a core network 130. Wireless communications system 100 may utilize CE techniques for communications between UEs 115 and base stations 105, and access procedures for UEs 115 utilizing CE may be different than access procedures for UEs 115 without CE. In some examples, the wireless communications system 100 may be a Long Term Evolution (LTE)/LTE-advanced (LTE-a) network.

Base stations 105 may wirelessly communicate with UEs 115 via one or more base station antennas. Base stations 105 may include or may be referred to by those skilled in the art as a base transceiver station, a radio base station, an access point, a radio transceiver, a NodeB, eNodeB (eNB), Home NodeB, a Home eNodeB, or some other suitable terminology. Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115.

UEs 115 may be dispersed throughout the wireless communications system 100, and each UE 115 may be stationary or mobile. A UE 115 may be referred to as a mobile station, a subscriber station, a remote unit, a wireless device, an access terminal, a handset, a user agent, a client, or some other suitable terminology. A UE 115 may also be a cellular phone, a wireless modem, a handheld device, a personal computer, a tablet, a personal electronic device, a machine type communication (MTC) device or the like.

UEs 115 that are MTC devices may provide for automated communication, and may include those device implementing Machine-to-Machine (M2M) communication or MTC. M2M or MTC may refer to data communication technologies that allow devices to communicate with one another or a base station 105 without human intervention. For example, M2M or MTC may refer to communications from devices that integrate sensors or meters to measure or capture information and relay that information to a central server or application program that can make use of the information or present the information to humans interacting with the program or application. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. An MTC device may operate using half-duplex (one-way) communications at a reduced peak rate. MTC devices may also be configured to enter a power saving "deep sleep" mode when not engaging in active communications. MTC and other low cost or low complexity wireless devices may be configured to utilize (e.g., transmit or receive, or both) using CE techniques.

Wireless communications system 100 may, for instance, utilize CE techniques to improve the quality or reliability of a communication link 125 for UEs 115 located at a cell edge, operating with low power transceivers, or experiencing high interference or path loss. CE techniques may include repeated transmissions, transmission time interval (TTI) bundling, hybrid automatic repeat request (HARQ) retransmission, PUSCH hopping, beamforming, power boosting, or other techniques. The CE techniques used may depend on the specific needs of UEs 115 in different circumstances. For example, TTI bundling may involve sending multiple copies of the same information in a group of consecutive TTIs rather than waiting for a negative acknowledgement (NACK) before retransmitting redundancy versions. This may be effective for users engaging in voice over Long Term evolution (VoLTE) or VOIP communications. In other cases, the number of HARQ retransmissions may also be increased. Uplink data transmissions may be transmitted using frequency hopping to achieve frequency diversity. Beamforming may be used to increase the strength of a signal in a particular direction, or the transmission power may simply be increased. In some cases, one or more CE options may be combined and CE levels may be defined based on a number of decibels the techniques are expected to improve a signal (e.g., no CE, 5 dB CE, 10 dB CE, 15 dB CE, etc.). For example, a first CE level may correspond to a 5 dB increase in a signal, a second CE level may correspond to a 10 dB increase, and so forth. The increased signal at each CE level may be achieved, for example, by an increased number of repetitions, increased transmission power, other CE techniques, or some combination of the above.

A UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as time division duplex (TDD) systems, may transmit an SSS but not a PSS. Both the PSS and the SSS may be located in the central 62 and 72 subcarriers of a carrier, respectively. After receiving the PSS and SSS, the UE 115 may receive a master information block (MIB), which may be transmitted in the physical broadcast channel (PBCH). The MIB may contain system bandwidth information, a system frame number (SFN), and a physical HARQ indicator channel (PHICH) configuration. After decoding the MIB, the UE 115 may receive one or more system information blocks (SIB s). For example, SIB1 may contain cell access parameters and scheduling information for other SIBs. Decoding SIB1 may enable the UE 115 to receive SIB2. SIB2 may contain radio resource control (RRC) configuration information related to random access channel (RACH) procedures, paging, physical uplink control channel (PUCCH), physical uplink shared channel (PUSCH), power control, SRS, and cell barring.

After completing initial cell synchronization, a UE 115 may decode the MIB, SIB1 and SIB2 prior to accessing the network. The MIB may be transmitted on PBCH and may utilize the first 4 orthogonal frequency division multiple access (OFDMA) symbols of the second slot of the first subframe of each radio frame. It may use the middle 6 resource blocks (RB) (72 subcarriers) in the frequency domain. The MIB carries a few important pieces of information for UE initial access, including: downlink (DL) channel bandwidth in term of RBs, PHICH configuration (duration and resource assignment), and SFN. A new MIB may be broadcast every fourth radio frame (SFN mod 4=0) at and rebroadcast every frame (10 ms). Each repetition is scrambled with a different scrambling code. After reading a MIB (either a new version or a copy), the UE 115 may can try different phases of a scrambling code until it gets a successful cyclic redundancy check (CRC) check. The phase of the scrambling code (0, 1, 2 or 3) may enable the UE 115 to identify which of the four repetitions has been received.

Thus, the UE 115 may determine the current SFN by reading the SFN in the decoded transmission and adding the scrambling code phase. After receiving the MIB, a UE may receive one or more SIBs. Different SIBs may be defined according to the type of system information conveyed. A new SIB1 may be transmitted in the fifth subframe of every eighth frame (SFN mod 8=0) and rebroadcast every other frame (20 ms). SIB1 includes access information, including cell identity information, and it may indicate whether a UE is allowed to camp on a cell of a base station 105. SIB1 also includes cell selection information (or cell selection parameters). Additionally, SIB1 includes scheduling information for other SIBs. SIB2 may be scheduled dynamically according to information in SIB1, and includes access information and parameters related to common and shared channels. The periodicity of SIB2 can be set to 8, 16, 32, 64, 128, 256 or 512 radio frames. In some cases, an additional SIB may be directed toward MTC devices, and may include a CE level dependent RACH configuration.

After the UE 115 decodes SIB2 (and, in some cases, the MTC SIB), it may transmit a RACH preamble to a base station 105. This may be known as RACH message 1. For example, the RACH preamble may be randomly selected from a set of 64 predetermined sequences. This may enable the base station 105 to distinguish between multiple UEs 115 trying to access the system simultaneously. The base station 105 may respond with a RAR, or RACH message 2, that provides an uplink (UL) resource grant, a timing advance and a temporary cell radio network temporary identity (C-RNTI). The UE 115 may then transmit an RRC connection request, or RACH message 3, along with a temporary mobile subscriber identity (TMSI) (if the UE 115 has previously been connected to the same wireless network) or a random identifier. The RRC connection request may also indicate the reason the UE 115 is connecting to the network (e.g., emergency, signaling, data exchange, etc.). The base station 105 may respond to the connection request with a contention resolution message, or RACH message 4, addressed to the UE 115, which may provide a new C-RNTI. If the UE 115 receives a contention resolution message with the correct identification, it may proceed with RRC setup. If the UE 115 does not receive a contention resolution message (e.g., if there is a conflict with another UE 115) it may repeat the RACH process by transmitting a new RACH preamble.

In some cases, a UE 115 may determine that a radio link has failed and initiate a radio link failure (RLF) procedure. For example, an RLF procedure may be triggered upon a radio link control (RLC) indication that a maximum number of retransmissions has been reached, upon receiving a maximum number of out-of-sync indications, or upon radio failure during a RACH procedure. In some cases (e.g., after reaching the limit for out-of-sync indications) a UE 115 may initiate a timer and wait to determine whether a threshold number of in-sync indications are received. If the number of in-sync indications exceeds the threshold prior to expiration of the timer, the UE 115 may abort the RLF procedure. Otherwise, the UE 115 may perform a RACH procedure to regain access to network. The RACH procedure may include transmitting an RRC connection re-establishment request including the C-RNTI, the cell identification (ID), security verification information, and a cause for re-establishment. The base station 105 receiving the request may respond with either an RRC connection re-establishment message or an RRC connection re-establishment rejection. The RRC connection re-establishment message may contain parameters for establishing a signaling radio bearer (SRB) for the UE 115 as well as information for generating a security key. Once the UE 115 receives the RRC connection establishment message it may implement the new SRB configuration and transmit an RRC connection re-establishment complete message to the base station 105.

As mentioned, wireless communications system 100 may be an LTE system, and may utilize OFDMA on the DL and single carrier frequency division multiple access (SC-FDMA) on the UL. OFDMA and SC-FDMA partition the system bandwidth into multiple (K) orthogonal subcarriers, which are also commonly referred to as tones or bins. Each subcarrier may be modulated with data. The spacing between adjacent subcarriers may be fixed, and the total number of subcarriers (K) may be dependent on the system bandwidth. For example, K may be equal to 72, 180, 300, 600, 900, or 1200 with a subcarrier spacing of 15 kilohertz (KHz) for a corresponding system bandwidth (with guard-band) of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands. MTC devise may utilize a subset of a wireless carrier for communication to conserve power. For example, some UEs 115 may support narrowband transmission and reception using a single 6 physical resource block (i.e., 1.08 MHz) subband.

A UE 115 may coordinate transmit power with a serving base station 105 to mitigate interference, improve the UL data rate, and prolong battery life. Uplink power control may include a combination of open-loop and closed-loop mechanisms. In open-loop power control the UE transmit power depends on estimates of the downlink path-loss and channel configuration. In closed-loop power control that the network can directly control the UE transmit power using explicit power-control commands. Open-loop power control may be used for initial access, whereas both open and closed loop control may be used for UL control and data transmission. A UE 115 may determine power using an algorithm that takes into account a maximum transmission power limit, a target base station receive power, path loss, modulation and coding scheme (MCS), the number of resources used for transmission, and the format of the transmitted data (e.g., physical UL control channel (PUCCH) format). Power adjustments may be made by a base station 105 using a transmit power command (TPC) messages, which may incrementally adjust the transmit power of a UE 115 as appropriate. In some cases, a UE 115 may determine a CE level based on the target receive power of a base station.

Wireless communications system 100 may utilize one or more enhanced component carriers (eCCs). An enhanced component carrier (eCC) may be characterized by features including: flexible bandwidth, different TTIs, and modified control channel configuration. In some cases, an eCC may be associated with a carrier aggregation (CA) configuration or a dual connectivity configuration (e.g., when multiple serving cells have a suboptimal backhaul link). An eCC may also be configured for use in unlicensed spectrum or shared spectrum (e.g., where more than one operator is licensed to use the spectrum). An eCC characterized by flexible bandwidth may include segments that may be utilized by UEs 115 that are not capable of monitoring the whole bandwidth or prefer to use a limited bandwidth (e.g., to conserve power).

In some cases, an eCC may utilize a different TTI length than other component carriers (CCs), which may include use of a reduced or variable symbol duration as compared with TTIs of the other CCs. The symbol duration may remain the same, in some cases, but each symbol may represent a distinct TTI. In some examples, an eCC may include multiple hierarchical layers associated with the different TTI lengths. For example, TTIs at one hierarchical layer may correspond to uniform 1 ms subframes, whereas in a second layer, variable length TTIs may correspond to bursts of short duration symbol periods. In some cases, a shorter symbol duration may also be associated with increased subcarrier spacing. In conjunction with the reduced TTI length, an eCC may utilize dynamic time division duplex (TDD) operation (i.e., it may switch from DL to UL operation for short bursts according to dynamic conditions.)

Flexible bandwidth and variable TTIs may be associated with a modified control channel configuration (e.g., an eCC may utilize an enhanced physical downlink control channel (ePDCCH) for DL control information). For example, one or more control channels of an eCC may utilize frequency-division multiplexing (FDM) scheduling to accommodate flexible bandwidth use. Other control channel modifications include the use of additional control channels (e.g., for evolved multimedia broadcast multicast service (eMBMS) scheduling, or to indicate the length of variable length UL and DL bursts), or control channels transmitted at different intervals. An eCC may also include modified or additional HARQ related control information.

Thus, a UE 115 may select a CE level based on a coverage limitation, such as a channel condition or UE category. The UE 115 may then receive system information from a base station 105 indicating an index of CE levels and corresponding physical random access channel PRACH configurations; and the UE 115 may transmit a random access preamble using the PRACH configuration for the selected CE level. For example, the UE 115 may transmit the preamble based on a frequency offset that corresponds to the selected CE level. In some cases, the UE 115 and base station may also associate groups of preambles with DL CE levels. The UE 115 may select a preamble from a group corresponding to a desired DL CE level for a RAR message. The base station 105 may determine the DL CE level based on the group the preamble was selected from and respond accordingly.

Figure 2:
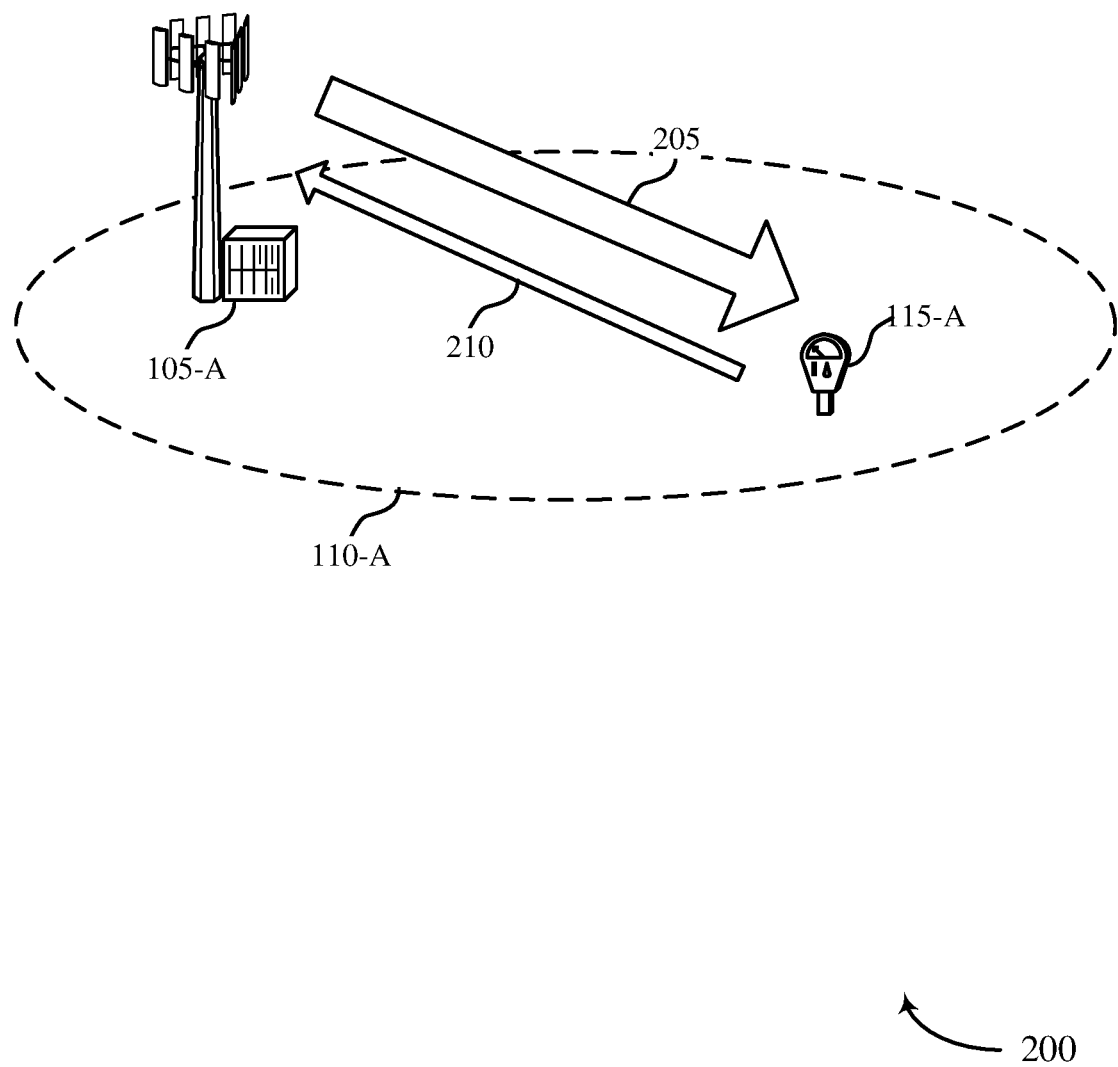
FIG. 2 illustrates an example of a wireless communications system that supports random access procedures under coverage limitations in accordance with various aspects of the present disclosure.

FIG. 2 illustrates an example of a wireless communications system 200 that supports random access procedures under coverage limitations in accordance with various aspects of the present disclosure. Wireless communications system 200 may include a UE 115-*a* and base station 105-*a*, which may be examples of a UE 115 and base station 105 described with reference to FIG. 1. UE 115-*a* may be a low cost (e.g., low complexity) device or an MTC device, and may utilize CE techniques for communication with base station 105-*a*. Specifically, UE 115-*a* may use a RACH procedure based on an UL CE level. For example, UE 115-*a* may transmit a RACH preamble on UL carrier 205 using a configuration based on the CE level, and may receive a RAR on DL carrier 210 based on a selected DL CE level, which may be different from the UL CE level.

RACH procedures may be performed differently according to different CE levels (e.g., four levels indicated by CE 0, CE 1, CE 2, or CE 3). For example, during the access procedure (e.g., RACH procedure), UE 115-*a* may use different time and frequency resources depending on a CE level. As another example, different preamble groups can be assigned to different CE levels within each region. Furthermore, a RAR intended for UE 115-*a* may be transmitted and may support multiple levels of bundling or repetition. Transmissions that are subsequent to the RACH procedure may use other, different levels of bundling or repetition.

The PRACH procedure may further include power and CE level ramp-up. A message 2 (i.e., RAR procedure) may include a scheduling procedure, a CE level determination, a RA-RNTI determination, and a response window. The message 3, (i.e., RRC connection setup) procedures may include asynchronous HARQ support and contention resolution.

PRACH resources may be signaled using a PRACH configuration index list for MTC devices. In some cases, the PRACH configuration index list may be broadcast in an MTC SIB. In some cases, the MTC SIB may be unicast. The configuration index list may contain a configuration index for each supported CE level. The list may also indicate power limitation or reference signal received power (RSRP) thresholds for picking a particular level and an initial PRACH target power per CE level. Each index may map to a corresponding PRACH configuration table. There may be separate tables for FDD and TDD, separate tables for each CE level, and separate PRACH frequency offsets for each CE level. Additionally or alternatively, a specific default PRACH configuration Index (or CE level) may be broadcast for certain types of UEs 115. For example, wearable devices, which may be low complexity devices, may use pre-defined CE levels to perform access and mobility procedures at an increased rate.

Resource multiplexing for PRACH CE may span multiple radio frames. This may increase flexibility for both TDMA and FDM. PRACH resources may be allocated based on a CE level and configuration index. For instance, the configuration index may include a starting subframe, periodicity and offset (e.g., time between repetitions or TTI offset), duration (e.g., number of TTIs), and a frequency offset indicating the narrowband region of the PRACH. For instance, the frequency offset for a certain CE level may correspond to multiple narrowband regions allocated for a CE level. In this way, resources assigned to certain CE levels may be separate or distinct from resources assigned to other CE levels.

UE 115-*a* may select PRACH resource based on contention-based procedures. For instance, UE 115-*a* may determine the PRACH CE level and select a PRACH configuration index based on the CE level form the PRACH configuration index list. UE 115-*a* may identify the first subframe available for PRACH based on the selected PRACH configuration index. The selected PRACH configuration index may communicate time and frequency resources available to UE 115-*a*. UE 115-*a* may additionally receive a PRACH Mask Index which may communicate time and frequency resources that are a subset of the time and frequency resources available to UE 115-*a*. UE 115-*a* may, furthermore, determine the first subframe available based on the layer 1 (L1; physical layer) timing requirement (e.g., measurement gap occurrence). If multiple PRACH configurations are available to UE 115-*a* according to the above determinations, UE 115-*a* may pick a PRACH at random. Alternatively, a UE may be explicitly provided with a CE, PRACH configuration index, PRACH mask index, and frequency offset by a base station.

UE 115-*a* may also determine an UL, or PRACH, CE level together with a transmit power level. In some cases, a UE may tentatively select an initial PRACH CE level (e.g., CE 0). Alternatively, a UE may pick a CE level based on explicit CE level signaling from a base station, based on path loss (PL) or RSRP thresholds broadcast from the base station, based on the CE level of the last successful RACH, or based on the preamble format (e.g., depending on the corresponding delta preamble parameter). UE 115-*a* may select the configuration index corresponding to the CE level and determine a time and frequency locations associated with a tentative PRACH transmission. UE 115-*a* may then choose a preamble and compute the preamble received target power. The target power may be based on an initial target power for the PRACH CE level, the preamble format, the number of preamble transmissions so far and the power ramping step. UE 115-*a* may compute the target PRACH transmission power based on the PL estimate. If the target PRACH transmission power level exceeds a maximum threshold, UE 115-*a* may select the next higher PRACH CE level and repeat the above process.

A DL CE level and an UL CE level may be different based on channel conditions. In some cases, the preamble may be successfully received whereas the RAR may not. The UE 115-*a* may identify to a base station a DL CE level during the preamble. The base station 105-*a* may configure preamble groups for each DL CE level and UE 115-*a* may select the preamble group based on its estimate of the DL CE level. In this way, a base station 105-*a* may identify which DL CE level may be used for a certain UE. In some cases, a DL CE level may be increased if a PRACH CE level is increased. A UE 115-*a* may be explicitly signaled a preamble to use by the base station 105-*a* for contention free access. Alternatively, for contention-based access, UE 115-*a* may determine a preamble group based on one or more of its DL CE level estimates.

The DL CE level estimate may be determined based on explicit base station signaling, DL signal measurements and comparison with thresholds, or a PRACH CE level estimate. The thresholds may be signaled by the base station 105-*a* and the comparison may be based on a reference DL transmission format that is signaled. After determining the preamble group, UE 115-*a* may randomly select a preamble. For an ongoing RACH procedure, if UE 115-*a* increases the PRACH CE level due to a previous PRACH failure, it may also increase the DL CE level estimate. Therefore, UE 115-*a* may select a new preamble for the ongoing RACH procedure corresponding to the DL CE level estimate.

UE 115-*a* may, in some examples, be a low cost or low complexity UE that uses narrowband resources but does not require CE. In such cases, UE 115-*a* may select a PRACH resource corresponding to CE 0 and a preamble corresponding to DL CE 0. Alternatively, base station 105-*a* may determine a DL CE level for UE 115-*a* based on the frequency and time resources used for a PRACH that are identified by the PRACH configuration index list.

In some cases, a media access control (MAC) preamble transmission counter may serve to enable PRACH power ramping and failure detection. Random access failure may be indicated to upper layers (e.g., on a PCell or PUCCH enabled SCell) when the preamble counter exceeds a threshold configured by RRC. In some cases, each PRACH CE transmission counts as a single transmission for the purpose of the preamble counter.

A RACH procedure may, in some examples, span multiple CEs. In such cases, either a single threshold configuration for the preamble counter may be used or different thresholds may be used for each CE level. If a single threshold is used, when selecting a higher PRACH CE level for an ongoing RACH, UE 115-*a* may reset the preamble counter. This may prevent UE 115-*a* from declaring a RACH problem too early—e.g., in the event that UE 115-*a* started with very low PRACH CE level. Alternatively, a larger maximum threshold (e.g, a total threshold across all PRACH CE levels) may be configured. If multiple thresholds are used, UE 115-*a* may declare RLF based on either reaching the max preamble threshold for a specific PRACH CE level, or by reaching a total threshold across all PRACH CE levels.

In some cases, UE 115-*a* may attempt to determine the DL CE level that base station 105-*b* will use for the RAR. The UE 115-*a* may estimate an appropriate or preferred DL CE level and indicate the level by its random access preamble. That is, base station 105-*a* may signal a mapping between DL CE level estimates and groups of preambles. Base station 105-*a* may also signal parameters that may be useful in estimating the DL CE level, such as a target error rate, modulation and coding scheme (MCS), target bit rate, number of resource blocks, etc. The UE 115-*a* may then attempt to decode the RAR based on the DL CE level indicated by its choice of preamble. Alternatively, UE 115-*a* may attempt to decode the response using multiple CE levels. In some cases, base station 105-*a* may also transmit the response at multiple CE levels. In some cases, the one or more pre-defined time intervals for monitoring may be based on the selected preamble format of the random access message. In some examples, the one or more pre-defined time intervals for monitoring is based at least in part on a CE level of the selected preamble format of the random access message.

The frequency location of the RAR may depend on the preamble group. Base station 105-*a* may broadcast a mapping of groups to frequency locations. In some cases, the group may determine the control and data resource for the response. In other cases, the group may determine the control location and the control may indicate the data location.

Thus, the RAR scheduling may be accomplished in one of several ways. First, the response may be dynamically scheduled. For example, multiple windows for receiving the response may be configured. The size of the window may depend on the CE level (e.g., the larger the CE level, the longer the window). UE 115-*a* may blindly monitor for RAR DL control in the corresponding CE level window until it decodes the RAR or the window expires. If the window expires, UE 115-*a* may re-attempt access. In some cases, UE 115-*a* may determine the window based on the chosen preamble and base station 105-*a* may also determines the window upon detection of the preamble. In some cases, one or more windows (e.g., pre-defined time intervals for monitoring) are determined based on broadcast signaling. Once the DL control is found, UE 115-*a* may obtain the RAR via data scheduling information in the DL control.

Alternatively, RAR may occur on pre-determined resources known by UE 115-*a*. Pre-defined RAR resources may be configured by base station 105-*a* or specified in some other manner. This may involve a fixed format for the RAR messages (i.e., fixed modulation and coding scheme (MCS), transport block size (TBS), or number of physical resource blocks (PRBs)). As another alternative, RAR control may be sent on fixed resources, and the control may dynamically schedule the data resource for the RAR.

If dynamic scheduling is used, in some examples, the corresponding control may be addressed to a specific RA-RNTI, which may be based on the time or frequency occasion of the PRACH resource within a radio frame. This means that UEs 115 selecting different preambles on the same PRACH may have the same random access RNTI (RA-RNTI) and decode the same RAR. While, in some examples, for RAR based on CE level, UEs 115 selecting different preamble groups may be given different RA-RNTIs, even if selecting the same PRACH configuration. As a result, UE 115-*a* may also change RA-RNTI during an ongoing RACH procedure if it selects a different preamble group. Thus, in addition to time and frequency location of the PRACH, base station 105-a and UE 115-a may use the preamble group to derive the RA-RNTI.

After receiving the RAR, UE 115-a may transmit an RRC connection request (RACH message 3). In some cases, the connection request may support only asynchronous HARQ (i.e., no PHICH). Retransmissions of the connection request may be fully scheduled via DL control. Several methods may be used to determine the control scheduling information (DL CE, frequency location). Either the same configuration may be used that was used for transmitting the preamble, the method may the same as the RAR, or periodic transmissions may be used in lieu of control messages (i.e., using previously received RAR grant information). Retransmission may occur until receiving a contention resolution message, until a maximum number of retransmissions have been attempted, or until a timer expires. In some cases, different contention resolution timers may be used for different CE levels. In some cases, an indication may be received in a RAR to continue monitoring for one or more further response messages.

Figure 3:
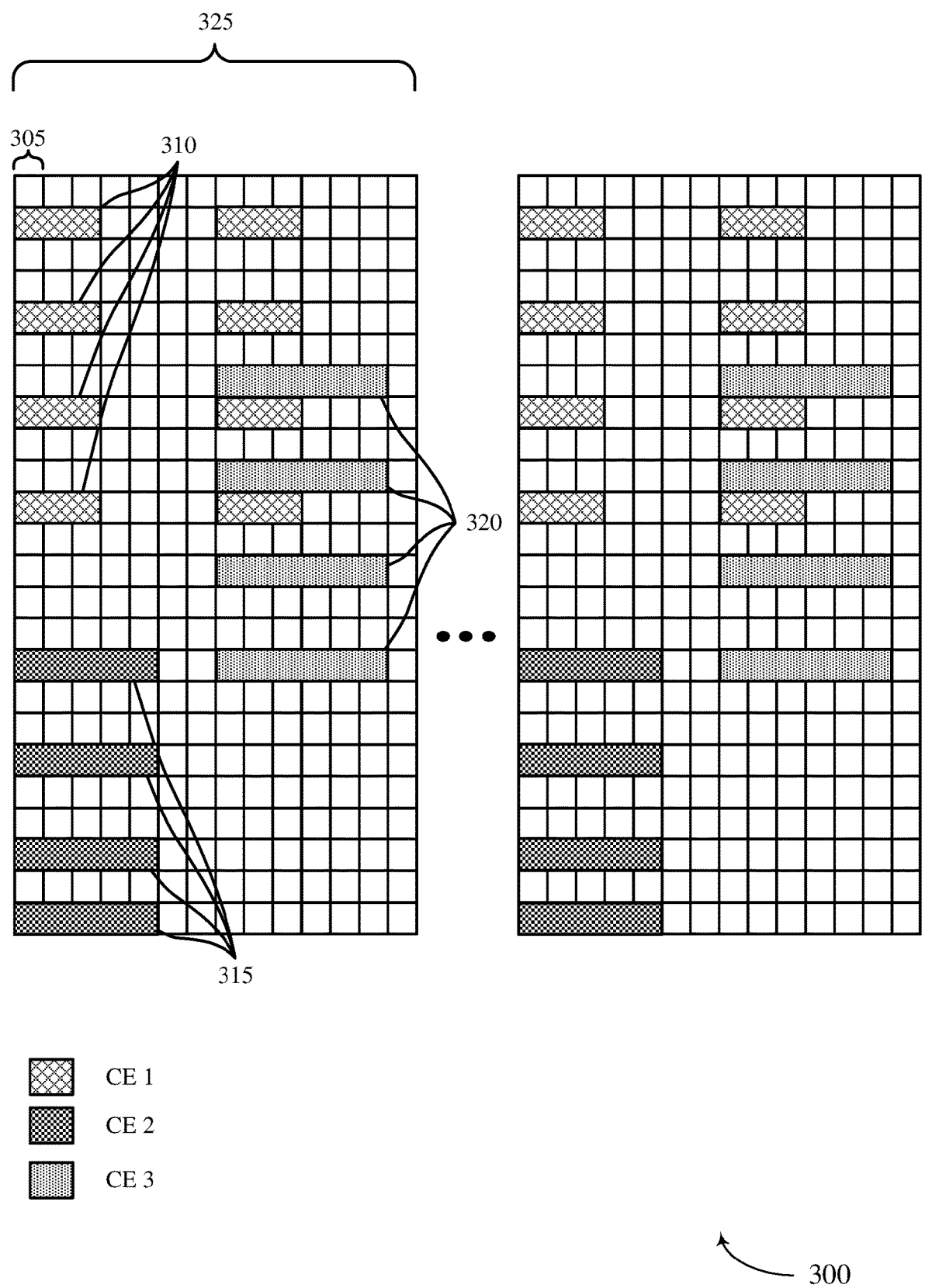
FIG. 3 illustrates an example of a preamble resource offset configuration that supports random access procedures under coverage limitations in accordance with various aspects of the present disclosure.

FIG. 3 illustrates an example of a preamble resource offset configuration 300 that supports random access procedures under coverage limitations in accordance with various aspects of the present disclosure. Preamble resource offset configuration 300 may illustrate aspects of a transmission between a UE 115 and a base station 105, as described above with reference to FIGS. 1-2. Preamble resource offset configuration 300 may allocate resources to different CE levels such as UL CE 1 resources 310, CE 2 resources 315, and CE 3 resources 320. Preamble resource offset configuration 300 may allocate resource elements 305 during each subframe 325. The allocated resources may be used for uplink transmissions from a UE 115 to a base station 105.

In some examples, a base station 105 may generate a PRACH configuration index list. The base station 105 may broadcast this list in a dedicated SIB to a UE 115. The list may contain at least one configuration index for each supported CE level. The list may additionally indicate thresholds for picking a CE level and an initial PRACH target power per CE level. Each index may map to a corresponding PRACH configuration table, which may include a table for FDD, a table for TDD, tables for each CE level, and PRACH frequency offsets for each CE level. The base station 105 may additionally broadcast a default PRACH configuration index for certain types of UEs 115 (e.g., wearable devices). PRACH resources may be allocated to a UE 115 based on the PRACH configuration index. The PRACH resources may span across multiple radio frames. PRACH resources may be allocated based on a PRACH index and a CE level and may be indicated using a starting subframe indicator, a periodicity (e.g., how many repetitions) and an offset (e.g., starting TTI in a subframe), a duration (e.g., number of TTIs), and a frequency offset indicating a narrowband region of the PRACH. In some cases, multiple narrowband regions may be indicated for a CE level.

Accordingly, resources may be allocated in the frequency domain and time domain based on CE levels. For instance, UL CE 1 resources 310 and UL CE 2 resources 315 may be multiplexed in the frequency domain, while CE 3 resources 320 may be multiplexed in the time domain. Each set of CE resources may correspond to a CE level and a certain transmission scheme. For instance, UL CE 1 resources 310 may use fewer resources than UL CE 2 resources 315 and CE 3 resources 320. In another example, UL CE 1 resources 310 may be transmit at a higher repetition level than UL CE 2 resources 315 and CE 3 resources 320.

A UE 115 may determine a CE level and may perform PRACH procedures according to the PRACH resource allocation. For instance, a first set of UEs 115 may be associated with CE 1. These UEs 115 may use UL CE 1 resources 310, where each UE 115 may choose a CE 1 resources 310 based on the indicated frequency offset. The UEs may then use the resources to transmit a preamble for a RACH procedure. Similarly, a second set of UEs 115, associated with CE 2, may use UL CE 2 resources 315. Each UE 115 may choose a CE 2 resources 315 based on the indicated frequency offset. A third set of UEs 115 may be associated with CE 3 and choose CE 3 resources 320 accordingly. Redundant versions of each set of resources may be transmitted across multiple subframes.

Figure 4A:
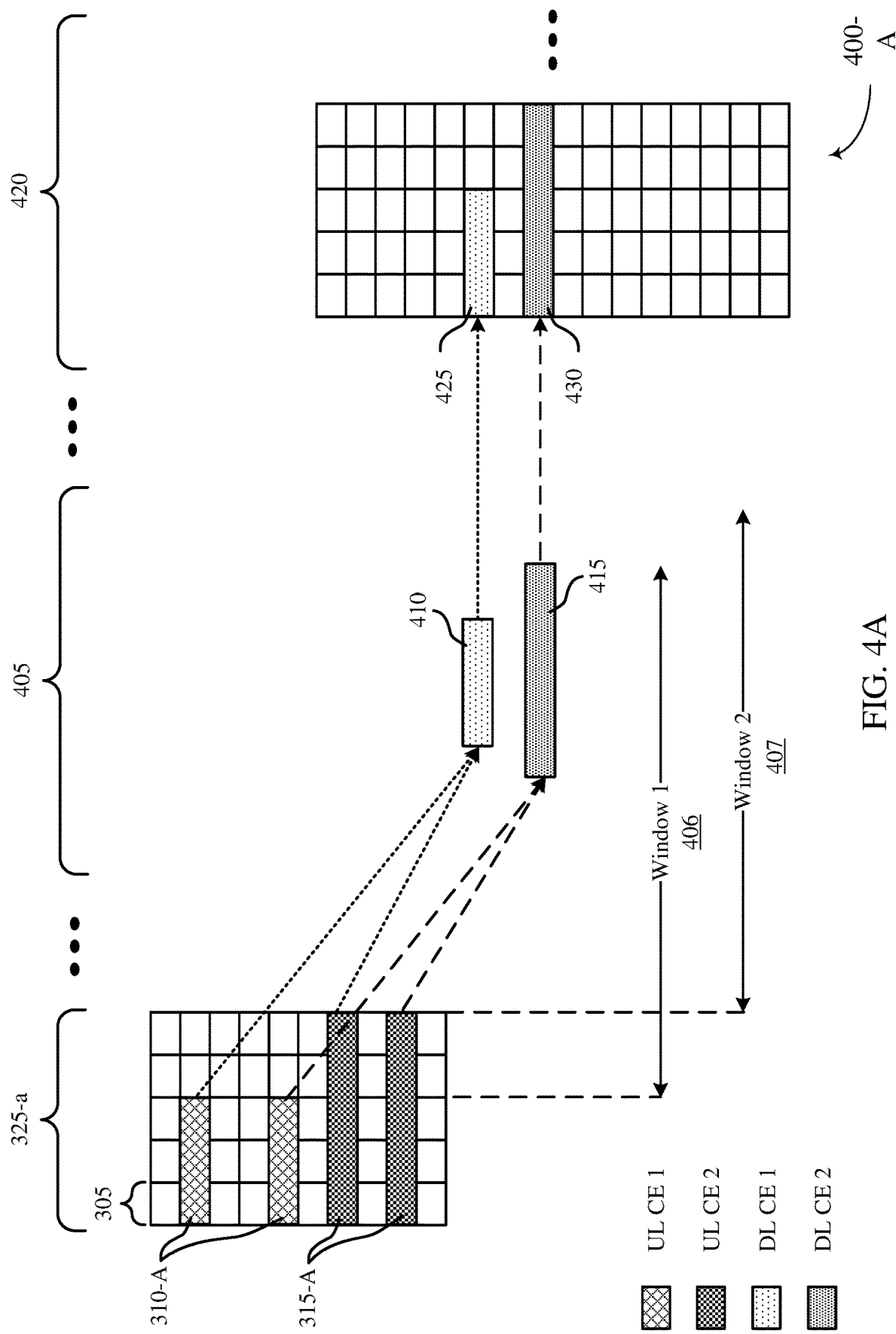
FIGS. 4A through 4C illustrate examples of random access response (RAR) scheduling configurations that support random access procedures under coverage limitations in accordance with various aspects of the present disclosure.

FIG. 4A illustrates an example of a RAR scheduling configuration 400-a that supports random access procedures under coverage limitations in accordance with various aspects of the present disclosure. RAR scheduling configuration 400-a may illustrate a dynamic RAR scheduling configuration as described with reference to FIG. 2. Dynamic scheduling may involve blind decoding of control candidates in order to identify the location of a RAR. Aspects of RAR scheduling configuration 400-a may be utilized by a UE 115 and a base station 105 as described herein.

RAR scheduling configuration 400-a illustrates scheduling for two different UL CE levels and two different DL (i.e., RAR) CE levels. UL CE 1 resources 310-a and UL CE 2 resources 315-a may be scheduled for an UL preamble transmission using resources in UL RACH region 401, and may be examples of UL CE 1 resources 310 and UL CE 2 resources 315 as described in FIG. 3. A base station 105 may respond to a preamble sent from a UE 115 with an RAR message. DL CE 1 control resources 410, DL CE 2 control resources 415, and CE 1 shared resources 425, and CE 2 shared resources 430 may be DL resources fused or reception of a RAR message.

The UE 115 may determine an UL CE level as discussed above; however, the DL CE level used for successful reception of the RAR message may be different from the UL CE level. For example, a UE 115 may indicate to a base station 105 may transmit a preamble using one CE level configuration (e.g., using either UL CE 1 resources 310-a or UL CE 2 resources 315-a) and may indicate a desired DL CE level by selecting a preamble from a group associated with that particular DL CE level. In some case, the UE 115 estimates the desired DL CE level based on the UL CE level. The UE 115 may then transmit the chosen preamble, thereby indicating to a base station 105 the selected DL CE level (e.g., DL CE level 1 or DL CE level 2). The base station 105 may then transmit a control message using DL CE1 control resources 410 or DL CE2 control resource 415 to a set of UEs 115 using control region 405.

The UE 115 may determine a search space for the RAR control resources based on the selected DL CE level. For instance, a UE 115 that selected a DL CE 1 may blind decode candidates looking for CE 1 control resources 410 (e.g., a control message) during first window 406. After successfully decoding DL CE 2 control resources 415, the UE 115 may decode the corresponding CE 2 shared resources 430 using data region 420 based on the control information. A UE 115 associated with CE level 2 may similarly search for a control message on CE 2 control resources 415 during second window 407 to determine where in the data region 420 to find the RAR message. The UE 115 may thus decode a control portion of the RAR based on an estimated DL CE level, and the UE 115 may identify an indicated CE level based on the control portion of the random access response. The UE 115 may decode a data portion of the RAR based on the indicated CE level.

Figure 4B:
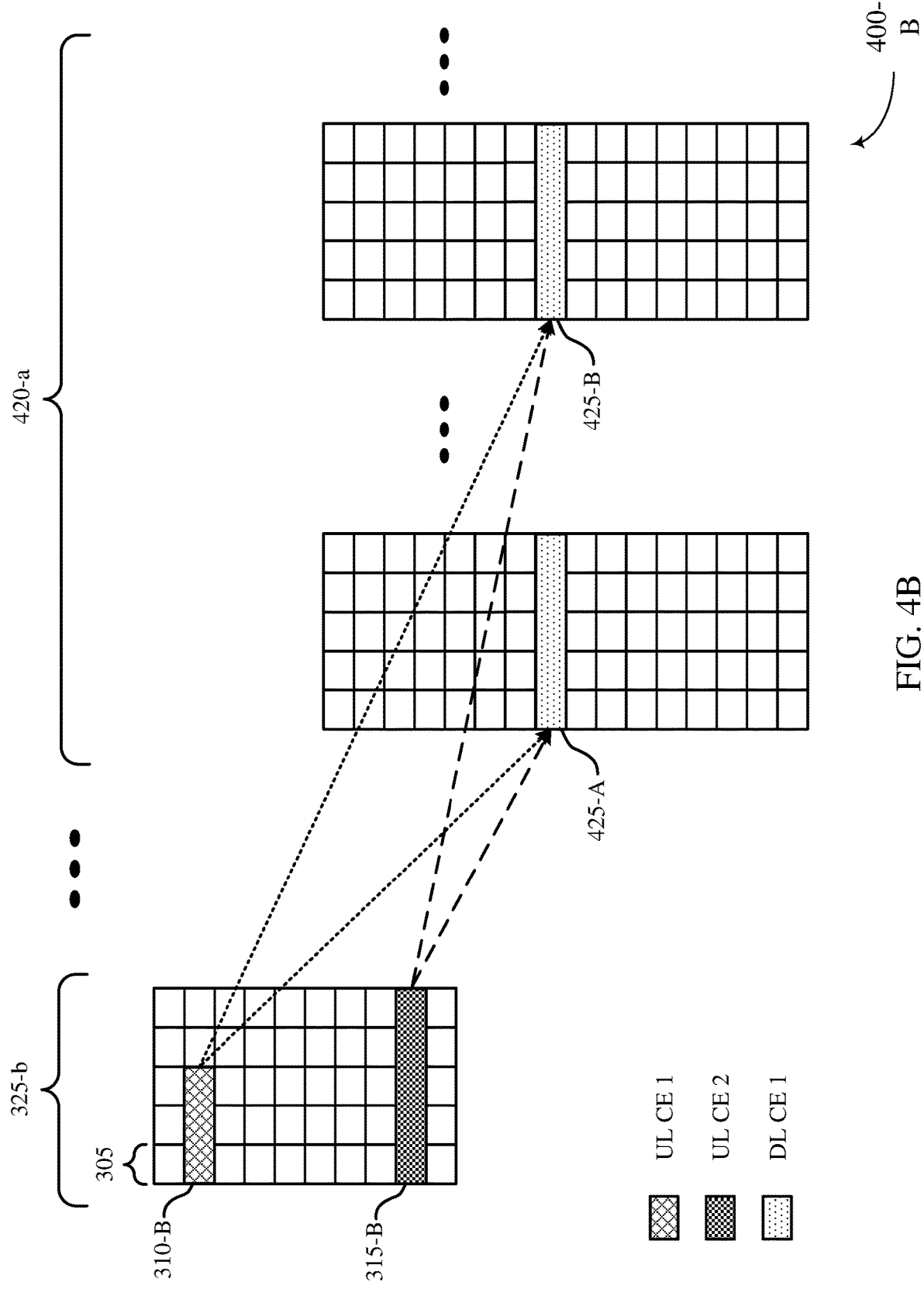

FIG. 4B illustrates an example of a RAR scheduling configuration 400-b that supports random access procedures under coverage limitations in accordance with various aspects of the present disclosure. RAR scheduling configuration 400-b may illustrate a fixed RAR scheduling configuration as described with reference to FIG. 2. Fixed scheduling may involve predetermined resources allocated for the transmission of a RAR based on a preamble configuration, and may not rely on the use of a control message. Aspects of RAR scheduling configuration 400-b may be utilized by a UE 115 and a base station 105 as described herein.

RAR scheduling configuration 400-b illustrates scheduling for two different UL CE levels and a single DL CE level. UL CE 1 resources 310-b and UL CE 2 resources 315-b may be scheduled for an UL preamble transmission using resources in UL RACH region 401-a, and may be examples of UL CE 1 resources 310 and UL CE 2 resources 315 as described in FIG. 3. A base station 105 may respond to a preamble sent from a UE 115 with an RAR message using fixed resources 435 within a data region 420-a. The DL CE level used for the RAR message may be fixed, but may be different from the UL CE level. In some cases, different fixed resources 435 may be used for different UL or DL CE levels (not shown). In some examples, the RAR may be transmitted multiple times with a given periodicity (e.g., using fixed resources 435-a and 435-b) before the message is successfully decoded.

Figure 4C:
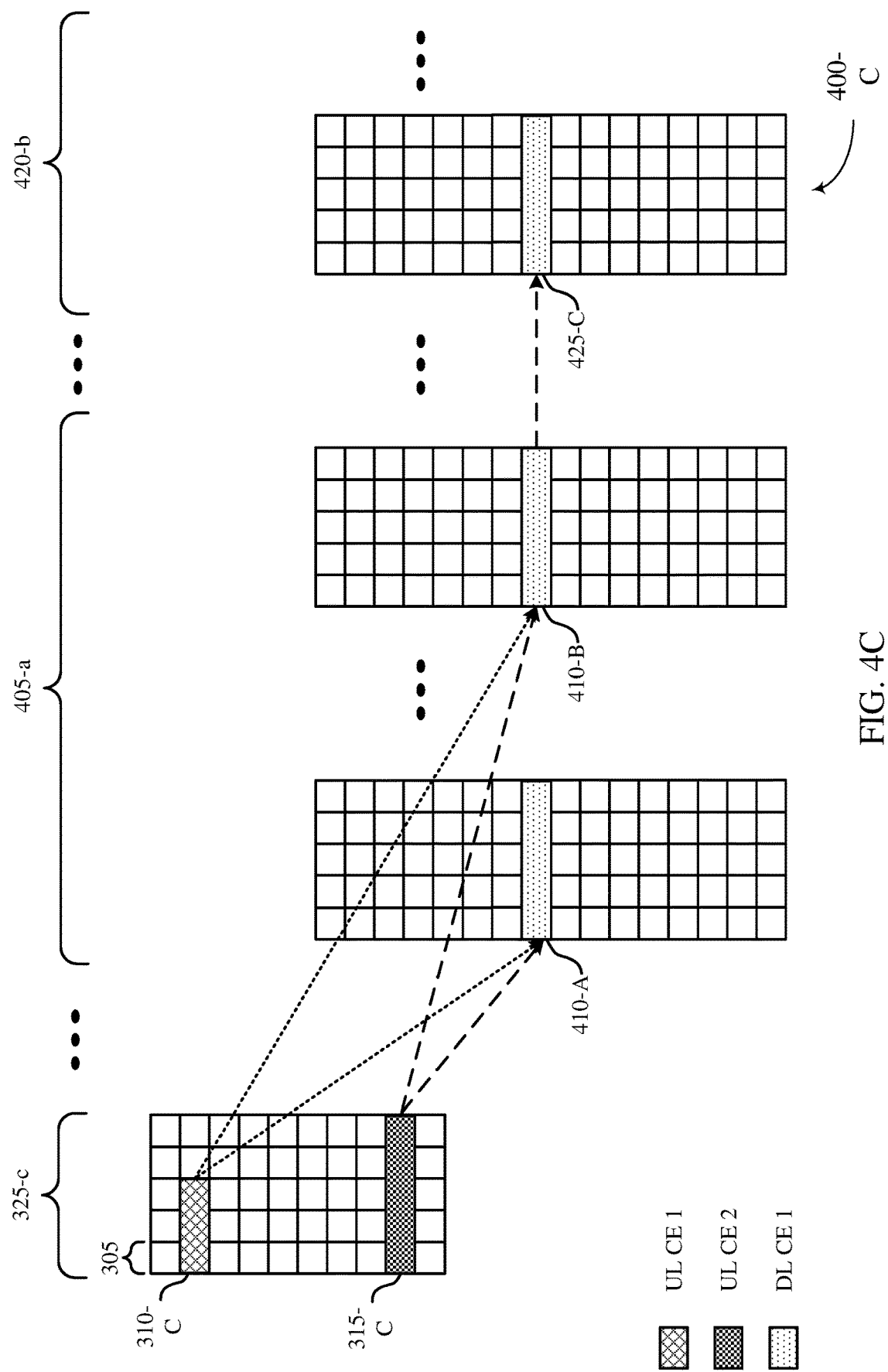

FIG. 4C illustrates an example of a RAR scheduling configuration 400-c that supports random access procedures under coverage limitations in accordance with various aspects of the present disclosure. RAR scheduling configuration 400-c may illustrate a fixed control RAR scheduling configuration as described with reference to FIG. 2. Aspects of RAR scheduling configuration 400-c may be utilized by a UE 115 and a base station 105 as described herein.

RAR scheduling configuration 400-c illustrates scheduling for two different UL CE levels and a single DL CE level. UL CE 1 resources 310-c and UL CE 2 resources 315-c may be scheduled for an UL preamble transmission using resources in UL RACH region 401-b, and may be examples of UL CE 1 resources 310 and UL CE 2 resources 315 as described in FIG. 3. A base station 105 may respond to a preamble sent from a UE 115 with an RAR control message using fixed control resources 410 within a control region 405-a. The DL CE level used for the RAR control message may be fixed, but may be different from the UL CE level. In some cases, different fixed control resources 410 may be used for different UL or DL CE levels (not shown). In some cases the RAR may be transmitted multiple times with a given periodicity (e.g., using fixed control resources 410-a and 410-b) before the control message is successfully decoded.

After successfully decoding the RAR control message (e.g., after the transmission on fixed control resources 410-b), the UE 115 may identify the shared resources 425-a used for transmission of the RAR itself. Shared resources 425-a may be scheduled within a data region 420-b. In some cases, the same DL CE level used for the RAR control message may be used for the RAR message.

Figure 5:
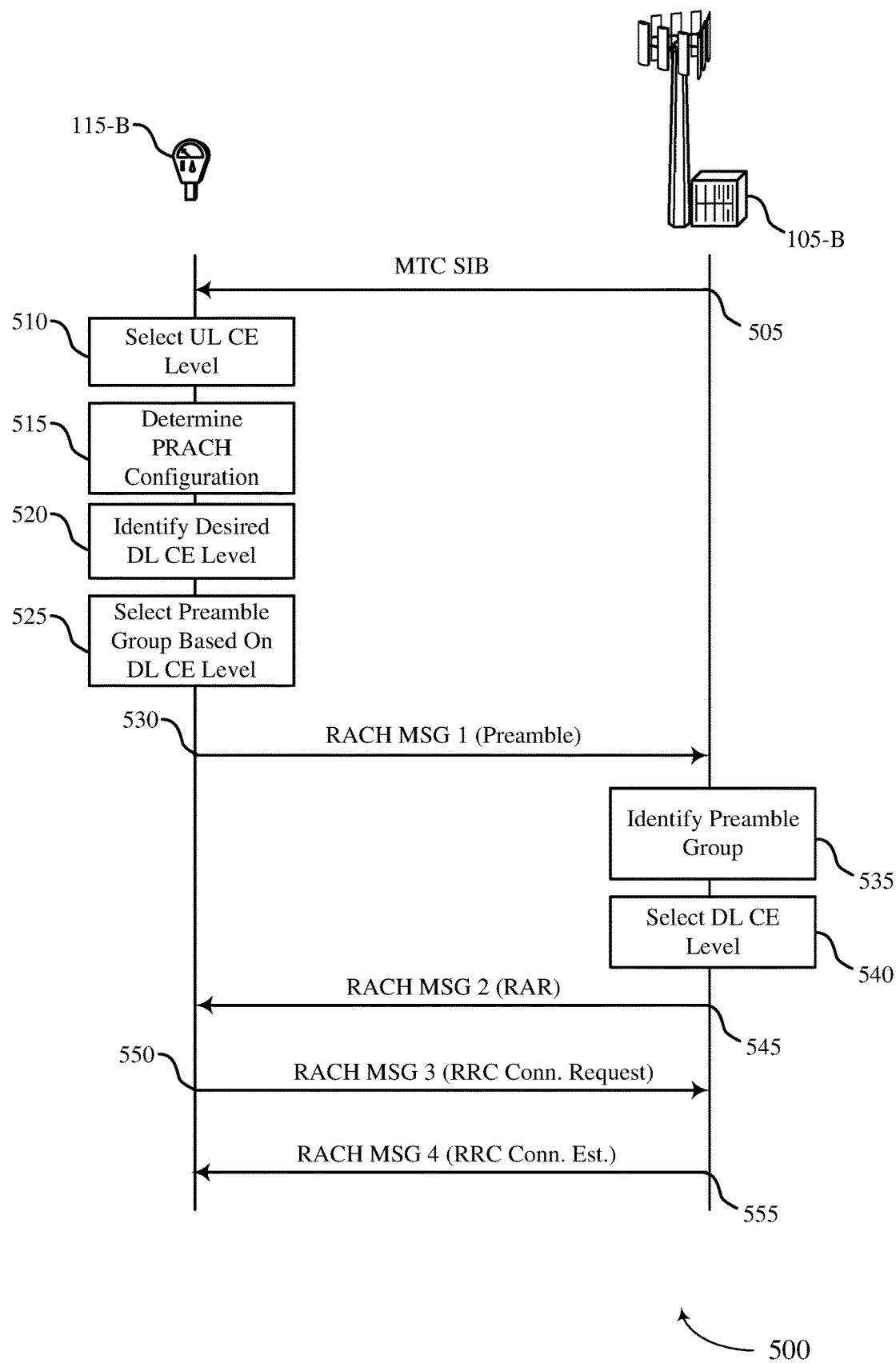
FIG. 5 illustrates an example of a process flow in a system that supports random access procedures under coverage limitations in accordance with various aspects of the present disclosure.

FIG. 5 illustrates an example of a process flow 500 for random access procedures under coverage limitations in accordance with various aspects of the present disclosure.

Process flow 500 may include a UE 115-b and base station 105-b, which may be examples of a UE 115 and base station 105 described with reference to FIGS. 1-2.

At 505, base station 105 may transmit and UE 115-b may receive system information including a list of PRACH configurations for different CE levels from base station 105-b. In some cases, the system information may be directed toward low cost (e.g., low complexity) or MTC devices. Thus, UE 115-b may receive signaling indicative of a set of PRACH configurations, and each PRACH configuration of the set may correspond to a coverage enhancement level supported by base station 105-b.

In some cases, UE 115-b may also receive signaling indicative of coverage limitation thresholds from base station 105-b. UE 115-b may determine the coverage limitation based on the received coverage limitation thresholds. In some examples, the coverage limitation include or related to a link budget, a path loss threshold, a reference signal received power (RSRP) threshold, an initial PRACH target power, or the like.

The UE 115-b may receive signaling indicative of a CE level from base station 105-b, and the selected CE level may correspond to the CE level indicated by base station 105-b. In some examples, the CE level indicated by base station 105-b includes a PRACH mask index or a frequency offset, or both. In some examples, the set of PRACH configurations includes a set of PRACH configurations for frequency division duplex (FDD) operation or a set of PRACH configurations for time division duplex (TDD) operation, or both. The set of PRACH configurations may include a set of deterministic values for each supported CE level. In some examples, the set of PRACH configurations includes a PRACH frequency offset corresponding to each supported CE level.

The UE 115-b may identify a default PRACH configuration based on a UE type (e.g., the type of UE 115-b); the random access message may be transmitted according to the default PRACH configuration. The UE type may include a UE category for UE 115-b or whether UE 115-b was previously configured (by base station 105-b, or both. In some examples, the set of PRACH configurations includes designated resources that are FDM or TDM, or both, over a several resource blocks. The received signaling may include a starting subframe index, a PRACH periodicity, a PRACH offset, a time duration, a frequency offset, or the like.

In some cases, UE 115-b may receive signaling from base station 105-b that indicates a mapping between an estimated DL CE level and a random access group.

At 510, UE 115-b may select an UL CE level for transmission of a RACH preamble. UE 115-b may select one of the CE levels from the PRACH configuration list based on a coverage limitation.

At 515, UE 115-b may determine a PRACH configuration (including a preamble format) based on the received system information. UE 115-b may also select the preamble format for the random access message based on the coverage limitation. In some examples, selecting the CE level is based on the selected preamble format.

In some cases, at 520, UE 115-b may identify a desired DL CE level for receiving a RAR. UE 115-b may thus select the random access group based on the received mapping. In such cases, at 525, UE 115-b may select a preamble group based on the desired DL CE level. This may enable UE 115-b to predict the DL CE level and decode a RAR accordingly. For example, UE 115-b may determine one or more resources for receiving the RAR based on the estimated DL CE level.

UE 115-*b* may determine a frequency resource for a RAR based on the selected random access group. In some examples, the random access group indicates control information associated with the RAR, and the determined frequency resource may include a control message. In some examples, the random access group indicates control information and data information associated with the RAR, and the determined frequency resource may include a control message or a data message, or both. In some case, UE 115-*b* may determine a random access radio network temporary identifier (RA-RNTI) based on the selected random access group.

Additionally or alternatively, UE 115-*b* may estimate a DL CE level based on explicit signaling from the base station, a comparison between a downlink signal measurement and a DL signal threshold, the selected coverage enhancement level, or the like; and the selected preamble format and group may be indicative of the estimated DL CE level. In some cases, the DL signal threshold is determined based on a reference DL transmission format.

At 530, UE 115-*b* may transmit (and base station 105-*b* my receive) a random access message (e.g., a RACH message 1 including a RACH preamble) using the UL CE level, the PRACH configuration, and a preamble selected from the preamble group. UE 115-*b* may also select resources for transmitting the random access message based on the PRACH configuration.

The UE 115-*b* may, in some examples, determine a target transmit power for the random access message based on the PRACH configuration, a selected preamble format, a prior transmission count, or the like. Selecting the CE level may be based on a counter of prior PRACH transmissions, for example. UE 115-*b* may then select a candidate CE level of the one or more CE levels supported by the base station and determine a candidate transmit power for the random access message based on the candidate CE level. In some cases, UE 115-*b* may determine that the candidate transmit power exceeds a transmit power threshold. UE 115-*b* may then repeat the process by selecting a new candidate CE level. Thus, in some examples the selection of the CE level is based on determining that the candidate transmit power exceeds the threshold, and selecting a new candidate CE level.

At 535, base station 105-*b* may identify the preamble group of the RACH message. At 540, base station 105-*b* may select a DL CE level based on the preamble group.

At 545, base station 105-*b* may transmit and UE 115-*b* may receive a RAR. UE 115-*b* may monitor the one or more resources for the RAR and decode the RAR based on the estimated DL CE level. In some examples, UE 115-*b* may monitor one or more pre-defined time intervals for receiving a RAR control message based on the selected resources and receive the RAR based on the RAR control message.

At 550, base station 105-*b* may transmit and base station 105-*b* may receive an RRC connection request (i.e., RACH message 3). Thus, UE 115-*b* may transmit a connection request message based on a configuration indicated in the random access message. UE 115-*b* may transmit a connection request message based on a configuration indicated in a received RAR. UE 115-*b* may retransmit the connection request message until one of receiving contention resolution message, exceeding a threshold number of retransmission attempts, or expiry of a contention resolution timer, or any combination thereof. In some examples the contention resolution timer is configured based on the selected CE level.

At 555, base station 105-*b* may transmit and UE 115-*b* may receive a connection establishment message (i.e., RACH message 4).

In some cases, the RACH procedure may be unsuccessful. This type of unsuccessful or failed procedure may occur when base station 105-*b* does not receive the first random access message, so UE 115-*b* may select a subsequent CE level based on an unsuccessful random access transmission. In some cases, UE 115-*b* may not receive the RAR. UE 115-*b* may select a subsequent CE level based on an unsuccessful random access transmission. UE 115-*b* may then reestimate the DL CE level based on selecting the subsequent CE level.

In some examples, UE 115-*b* may initiate a random access transmission counter upon transmitting the random access message, and UE 115-*b* may reset the random access transmission counter based on selecting the subsequent CE level. In some cases, UE 115-*b* may declare a radio link failure based on a threshold number of unsuccessful random access transmissions; the set of PRACH configurations may include the threshold.

Figure 6:
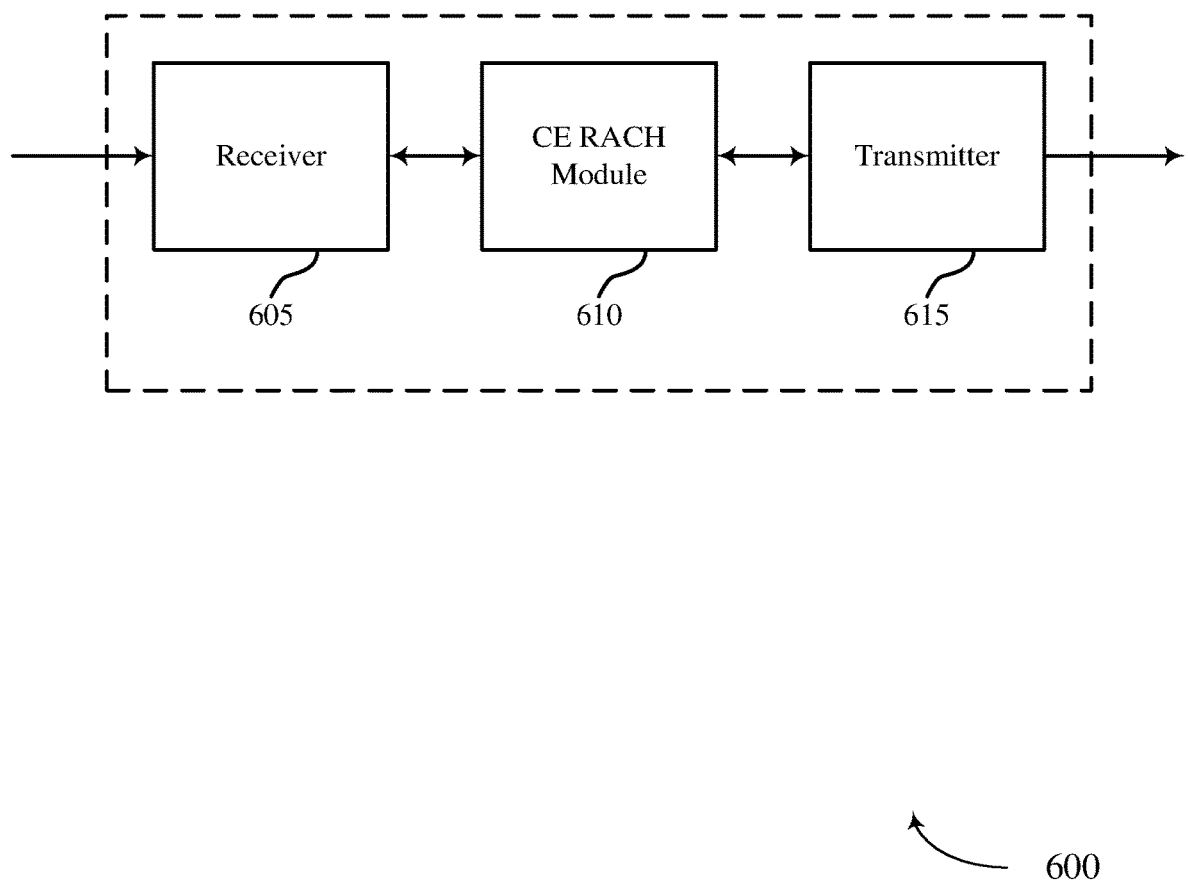
FIGS. 6-8 show block diagrams of a wireless device or devices that support random access procedures under coverage limitations in accordance with various aspects of the present disclosure.

FIG. 6 shows a block diagram of a wireless device 600 that supports random access procedures under coverage limitations in accordance with various aspects of the present disclosure. Wireless device 600 may be an example of aspects of a UE 115 described with reference to FIGS. 1-5. Wireless device 600 may include a receiver 605, a CE RACH module 610, or a transmitter 615. Wireless device 600 may also include a processor. Each of these components may be in communication with one another.

The receiver 605 may receive information such as packets, user data, or control information associated with various information channels (e.g., control channels, data channels, and information related to random access procedures under coverage limitations, etc.). Information may be passed on to the CE RACH module 610, and to other components of wireless device 600. In some examples, the receiver 605 may receive a RAR. In some examples, the receiver 605 may receive a RAR based on a RAR control message.

The CE RACH module 610 may receive signaling indicative of a set of PRACH configurations, and each PRACH configuration of the set may correspond to a coverage enhancement level supported by a base station, select one of the CE levels based on a coverage limitation, and transmit a random access message according to a PRACH configuration corresponding to the selected CE level.

The transmitter 615 may transmit signals received from other components of wireless device 600. In some examples, the transmitter 615 may be collocated with the receiver 605 in a transceiver module. The transmitter 615 may include a single antenna, or it may include a plurality of antennas. In some examples, the transmitter 615 may transmit a connection request message based on a configuration indicated in the random access message. In some examples, the transmitter 615 may transmit a connection request message based on a configuration indicated in a received RAR.

Figure 7:
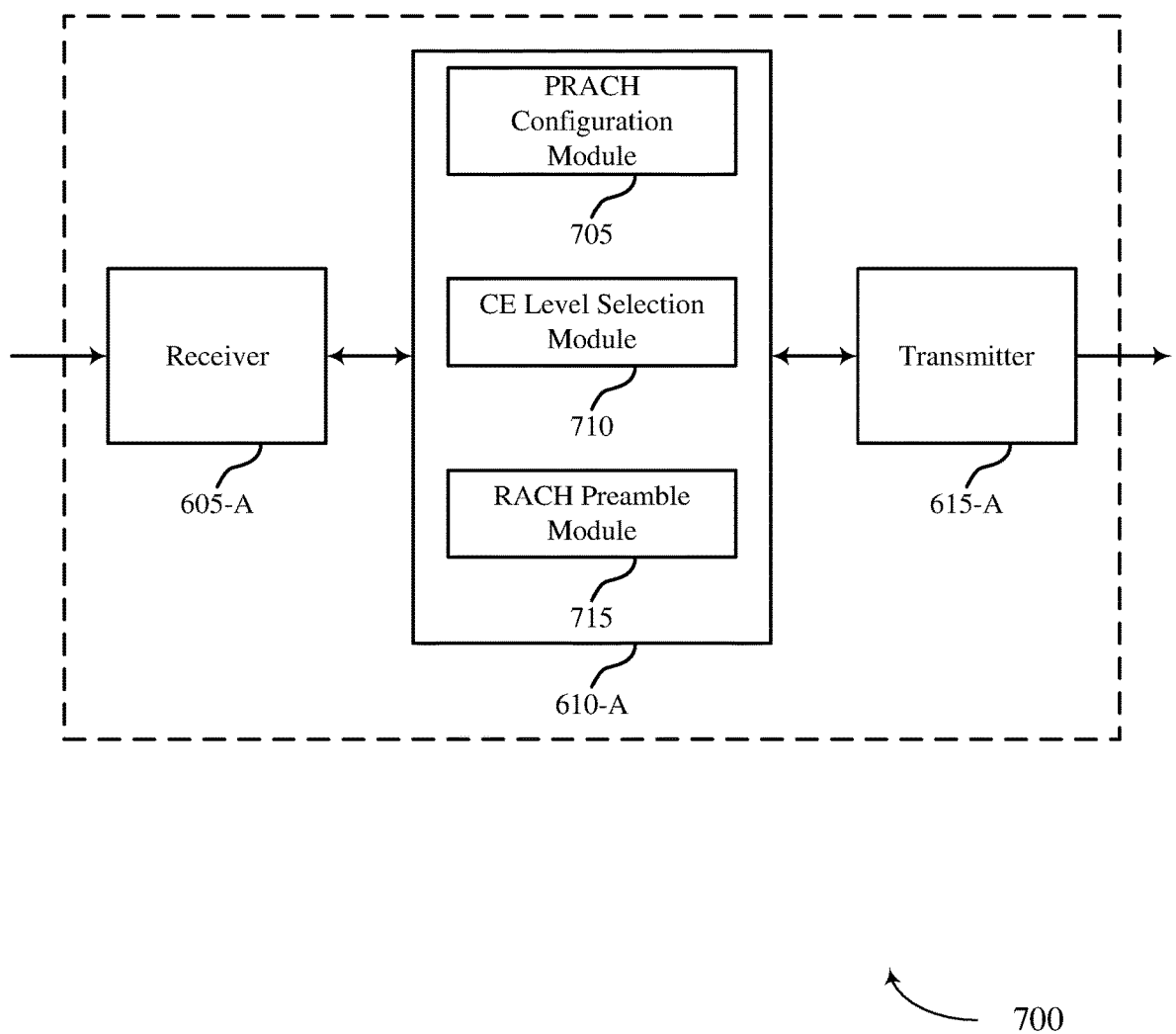

FIG. 7 shows a block diagram of a wireless device 700 that supports random access procedures under coverage limitations in accordance with various aspects of the present disclosure. Wireless device 700 may be an example of aspects of a wireless device 600 or a UE 115 described with reference to FIGS. 1-6. Wireless device 700 may include a receiver 605-*a*, a CE RACH module 610-*a*, or a transmitter 615-*a*. Wireless device 700 may also include a processor. Each of these components may be in communication with one another. The CE RACH module 610-*a* may also include a PRACH configuration module 705, a CE level selection module 710, and a RACH preamble module 715.

The receiver 605-*a* may receive information, which may be passed on to CE RACH module 610-*a*, and to other components of wireless device 700. The CE RACH module 610-*a* may perform the operations described with reference to FIG. 6. The transmitter 615-*a* may transmit signals received from other components of wireless device 700.

The PRACH configuration module 705 may receive signaling indicative of a set of PRACH configurations, and each PRACH configuration of the set may correspond to a coverage enhancement level supported by a base station as described with reference to FIGS. 2-5. In some examples, the set of PRACH configurations includes a set of PRACH configurations for FDD operation or a set of PRACH configurations for TDD operation, or both. In some examples, the set of PRACH configurations includes a set of deterministic values for each supported CE level. Additionally or alternatively, the set of PRACH configurations may include a PRACH frequency offset corresponding to each supported CE level. The PRACH configuration module 705 may also identify a default PRACH configuration based on a UE type, and the random access message may be transmitted according to the default PRACH configuration. In some examples, the UE type is defined as a UE category or a previously configured UE (e.g. a UE that was previously configured), or both. In some examples, the set of PRACH configurations includes designated resources that are FDM or TDM, or both, over a plurality of resource blocks. In various examples, the received signaling may be a starting subframe index, a PRACH periodicity, a PRACH offset, a time duration, or a frequency offset.

The CE level selection module 710 may select one of the CE levels based on a coverage limitation as described with reference to FIGS. 2-5. In some examples, selecting the CE level may be based on the selected preamble format. The CE level selection module 710 may also select a subsequent CE level based on an unsuccessful random access transmission. In some examples, selecting the CE level may be based on a counter of prior PRACH transmissions. The CE level selection module 710 may also select a candidate CE level of the one or more CE levels supported by the base station. In some examples, the selection of the CE level may be based on determining that the candidate transmit power exceeds the threshold, and the CE level may be higher than the candidate CE level. The CE level selection module 710 may also receive signaling indicative of a CE level from the base station, where the selected CE level corresponds to the CE level indicated by the base station. In some examples, the CE level indicated by the base station includes a PRACH mask index or a frequency offset, or both. The CE level selection module 710 may also select a subsequent CE level based on an unsuccessful random access transmission.

The RACH preamble module 715 may transmit a random access message according to a PRACH configuration corresponding to the selected CE level as described with reference to FIGS. 2-5. The RACH preamble module 715 may also select a preamble format for the random access message based on the coverage limitation. The RACH preamble module 715 may also reset the random access transmission counter based on selecting the subsequent CE level. The RACH preamble module 715 may also transmit a random access message based on the selected random access group. The RACH preamble module 715 may also receive a random access message based on the random access group.

Figure 8:
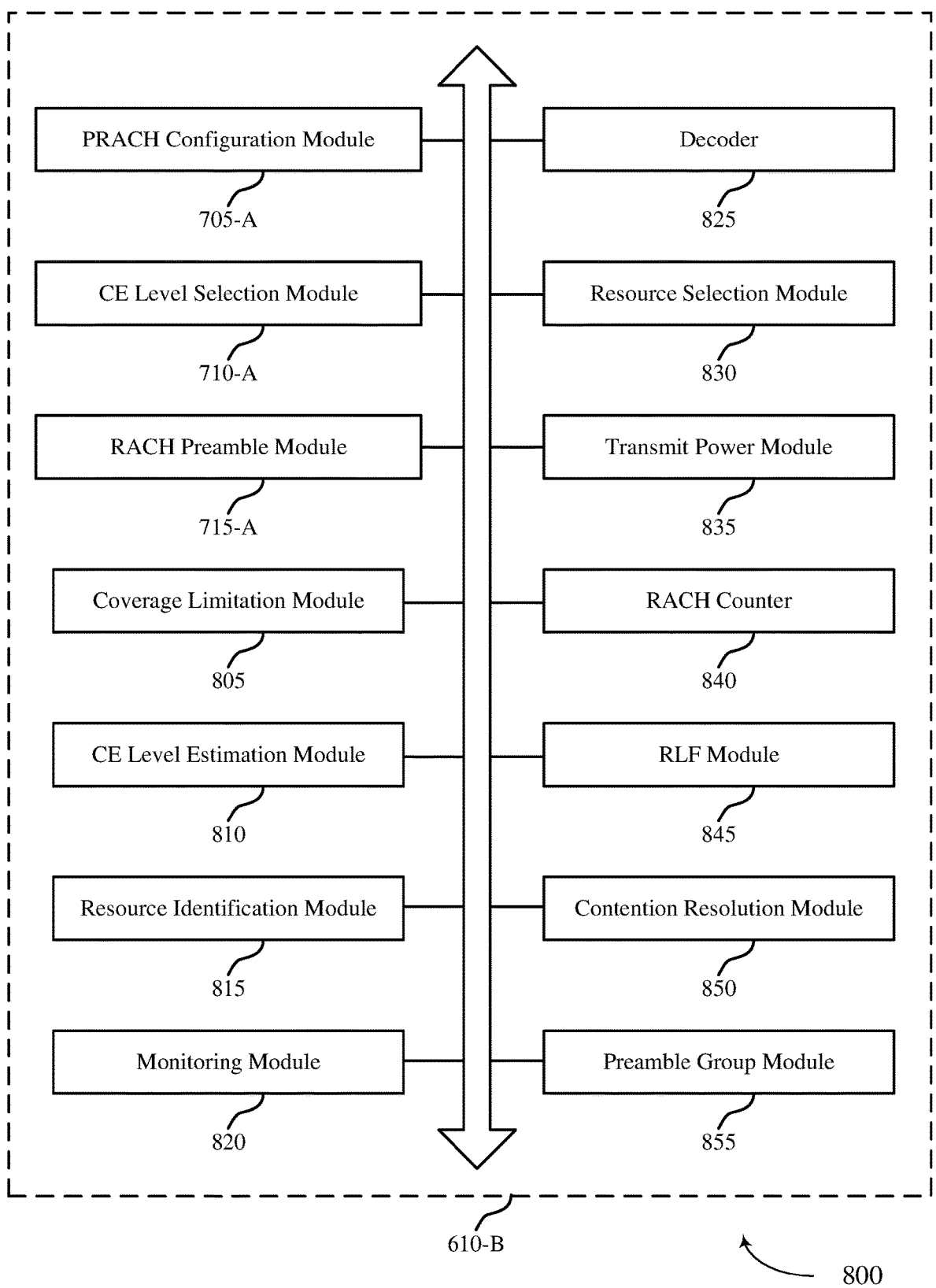

FIG. 8 shows a block diagram 800 of a CE RACH module 610-*b* which may be a component of a wireless device 600 or a wireless device 700 for random access procedures under coverage limitations in accordance with various aspects of the present disclosure. The CE RACH module 610-*b* may be an example of aspects of a CE RACH module 610 described with reference to FIGS. 6-7. The CE RACH module 610-*b* may include a PRACH configuration module 705-*a*, a CE level selection module 710-*a*, and a RACH preamble module 715-*a*. Each of these modules may perform the functions described with reference to FIG. 7. The CE RACH module 610-*b* may also include a coverage limitation module 805, a CE level estimation module 810, a resource identification module 815, a monitoring module 820, a decoder 825, a resource selection module 830, a transmit power module 835, a RACH counter 840, a RLF module 845, a contention resolution module 850, and a preamble group module 855.

The coverage limitation module 805 may receive signaling indicative of one or more coverage limitation thresholds from the base station as described with reference to FIGS. 2-5. The coverage limitation module 805 may also determine the coverage limitation based on the received coverage limitation thresholds. In some examples, the coverage limitation includes a link budget, a path loss threshold, a RSRP threshold, or an initial PRACH target power, or a combination thereof.

The CE level estimation module 810 may estimate a DL CE level based on explicit signaling from the base station, a comparison between a downlink signal measurement and a DL signal threshold, or the selected coverage enhancement level; and the selected preamble format may be indicative of the estimated DL CE level as described with reference to FIGS. 2-5. The CE level estimation module 810 may also reestimate the DL CE level based on selecting the subsequent CE level.

The resource identification module 815 may determine one or more resources for receiving a RAR based on the estimated DL CE level as described with reference to FIGS. 2-5. In some examples, the resource identification module 815 may identify an indicated CE level for decoding a data portion of a RAR based on information in control portion of the RAR.

The monitoring module 820 may monitor the one or more resources for the RAR as described with reference to FIGS. 2-5. The monitoring module 820 may also monitor one or more pre-defined time intervals for receiving a RAR based on the selected resources. The monitoring module 820 may also monitor one or more pre-defined time intervals for receiving a RAR control message based on the selected resources.

The decoder 825 may decode the RAR based on the estimated DL CE level as described with reference to FIGS. 2-5. In some examples, the decoder 825 may decode a control portion of the RAR based on the estimated DL CE level, and it may decode a data portion of the RAR based on an indicated CE level identified in the control portion of the RAR.

The resource selection module 830 may select resources for transmitting the random access message based on the PRACH configuration as described with reference to FIGS. 2-5. The resource selection module 830 may also select resources for transmitting the random access message based on the PRACH configuration.

The transmit power module 835 may determine a target transmit power for the random access message based on the PRACH configuration, a selected preamble format, or a prior transmission count as described with reference to FIGS. 2-5. The transmit power module 835 may also determine a candidate transmit power for the random access message. The transmit power module 835 may also determine that the candidate transmit power exceeds a transmit power threshold.

The RACH counter 840 may initiate a random access transmission counter upon transmitting the random access message as described with reference to FIGS. 2-5.

The RLF module 845 may declare a radio link failure based on a threshold number of unsuccessful random access transmissions, and the set of PRACH configurations include the threshold as described with reference to FIGS. 2-5.

The contention resolution module 850 may retransmit the connection message until at least one of receiving contention resolution message, exceeding a threshold number of retransmission attempts, or expiry of a contention resolution timer, or any combination thereof as described with reference to FIGS. 2-5. In some examples, the contention resolution timer may be configured based on the selected CE level.

The preamble group module 855 may receive signaling that indicates a mapping between an estimated DL CE level and a random access group as described with reference to FIGS. 2-5. The preamble group module 855 may also select the random access group based on the mapping. The preamble group module 855 may also determine a frequency resource for a RAR based on the selected random access group. In some examples, the random access group indicates control information associated with the RAR, and the determined frequency resource may include a control message. In some examples, the random access group indicates control information and data information associated with the RAR, and the determined frequency resource may include a control message or a data message, or both. The preamble group module 855 may also determine a random access radio network temporary identifier (RA-RNTI) based on the selected random access group.

Figure 9:
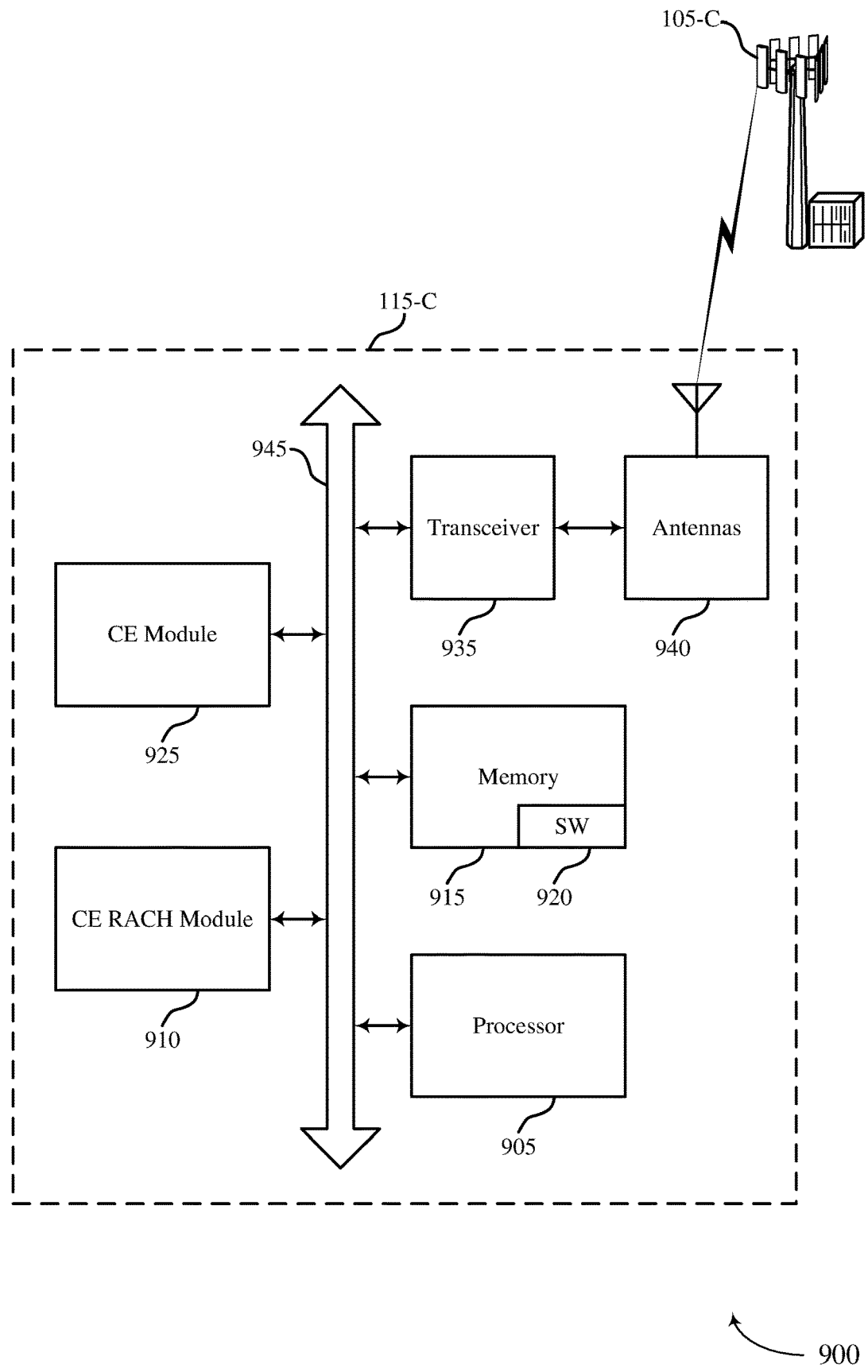
FIG. 9 illustrates a block diagram of a system including a user equipment (UE) that supports random access procedures under coverage limitations in accordance with various aspects of the present disclosure.

FIG. 9 shows a diagram of a system 900 including a UE 115 that supports random access procedures under coverage limitations in accordance with various aspects of the present disclosure. System 900 may include UE 115-*c*, which may be an example of a wireless device 600, a wireless device 700, or a UE 115 described with reference to FIGS. 1, 2 and 6-8. UE 115-*c* may include a CE RACH module 910, which may be an example of a CE RACH module 610 described with reference to FIGS. 6-8. UE 115-*c* may also include a CE module 925. UE 115-*c* may also include components for bi-directional voice and data communications including components for transmitting communications and components for receiving communications. For example, UE 115-*c* may communicate bi-directionally with base station 105-*c*.

CE module 925 may manage CE operations to improve the reliability of a communication link as described above with reference to FIG. 1. UE 115-*c* may also include a processor 905, and memory 915 (including software (SW) 920), a transceiver 935, and one or more antenna(s) 940, each of which may communicate, directly or indirectly, with one another (e.g., via buses 945). The transceiver 935 may communicate bi-directionally, via the antenna(s) 940 or wired or wireless links, with one or more networks, as described above. For example, the transceiver 935 may communicate bi-directionally with a base station 105 or another UE 115. The transceiver 935 may include a modem to modulate the packets and provide the modulated packets to the antenna(s) 940 for transmission, and to demodulate packets received from the antenna(s) 940. While UE 115-*c* may include a single antenna 940, UE 115-*c* may also have multiple antennas 940 capable of concurrently transmitting or receiving multiple wireless transmissions.

The memory 915 may include random access memory (RAM) and read only memory (ROM). The memory 915 may store computer-readable, computer-executable software/firmware code 920 including instructions that, when executed, cause the processor 905 to perform various functions described herein (e.g., random access procedures under coverage limitations, etc.). Alternatively, the software/firmware code 920 may not be directly executable by the processor 905 but cause a computer (e.g., when compiled and executed) to perform functions described herein. The processor 905 may include an intelligent hardware device, (e.g., a central processing unit (CPU), a microcontroller, an application specific integrated circuit (ASIC), etc.)

Figure 10:
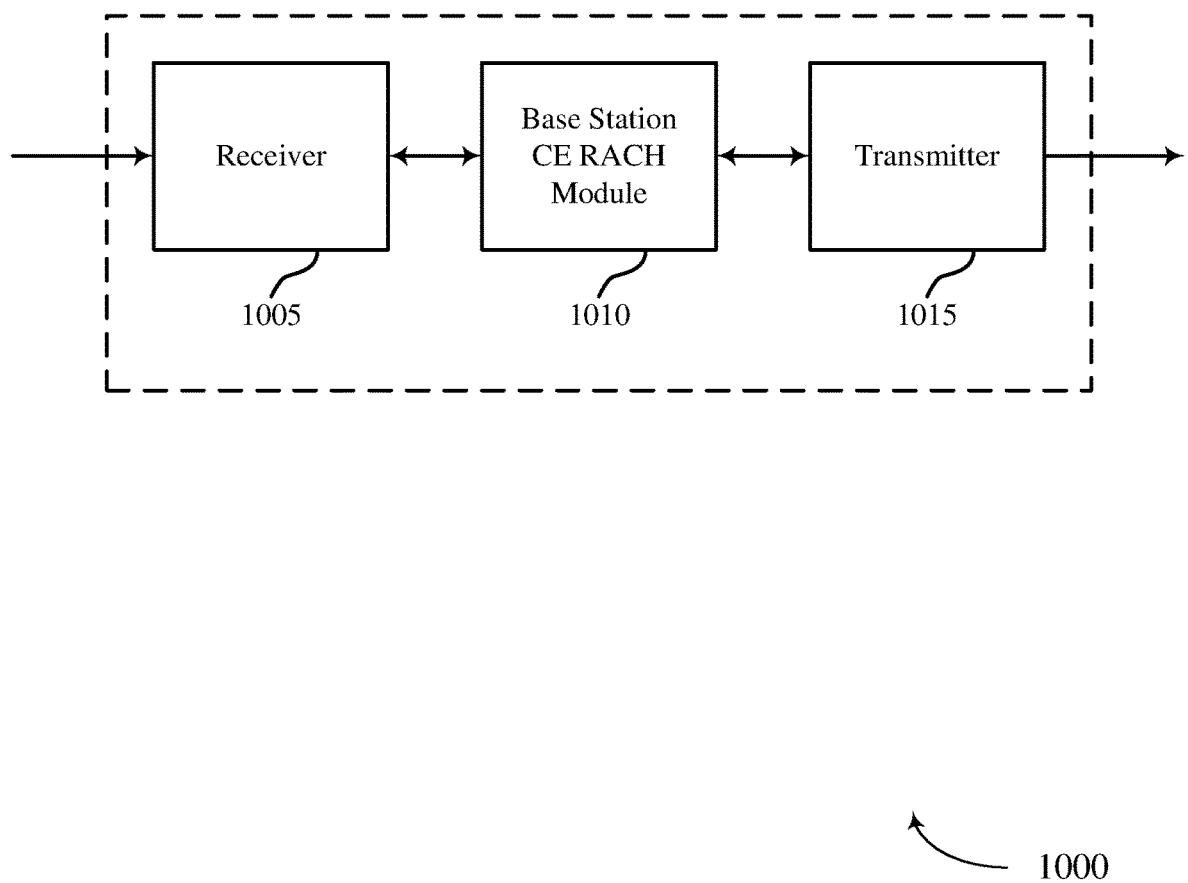
FIGS. 10 through 12 show block diagrams of a wireless device or devices that support random access procedures under coverage limitations in accordance with various aspects of the present disclosure.

FIG. 10 shows a block diagram of a wireless device 1000 that supports random access procedures under coverage limitations in accordance with various aspects of the present disclosure. Wireless device 1000 may be an example of aspects of a base station 105 described with reference to FIGS. 1-9. Wireless device 1000 may include a receiver 1005, a base station CE RACH module 1010, or a transmitter 1015. Wireless device 1000 may also include a processor. Each of these components may be in communication with one another.

The receiver 1005 may receive information such as packets, user data, or control information associated with various information channels (e.g., control channels, data channels, and information related to random access procedures under coverage limitations, etc.). Information may be passed on to the base station CE RACH module 1010, and to other components of wireless device 1000.

The base station CE RACH module 1010 may transmit signaling indicative of a set of PRACH configurations, and each PRACH configuration of the set may correspond to a supported coverage enhancement level, and receive a random access message according to a PRACH configuration of the set of PRACH configurations.

The transmitter 1015 may transmit signals received from other components of wireless device 1000. In some examples, the transmitter 1015 may be collocated with the receiver 1005 in a transceiver module. The transmitter 1015 may include a single antenna, or it may include a plurality of antennas.

Figure 11:
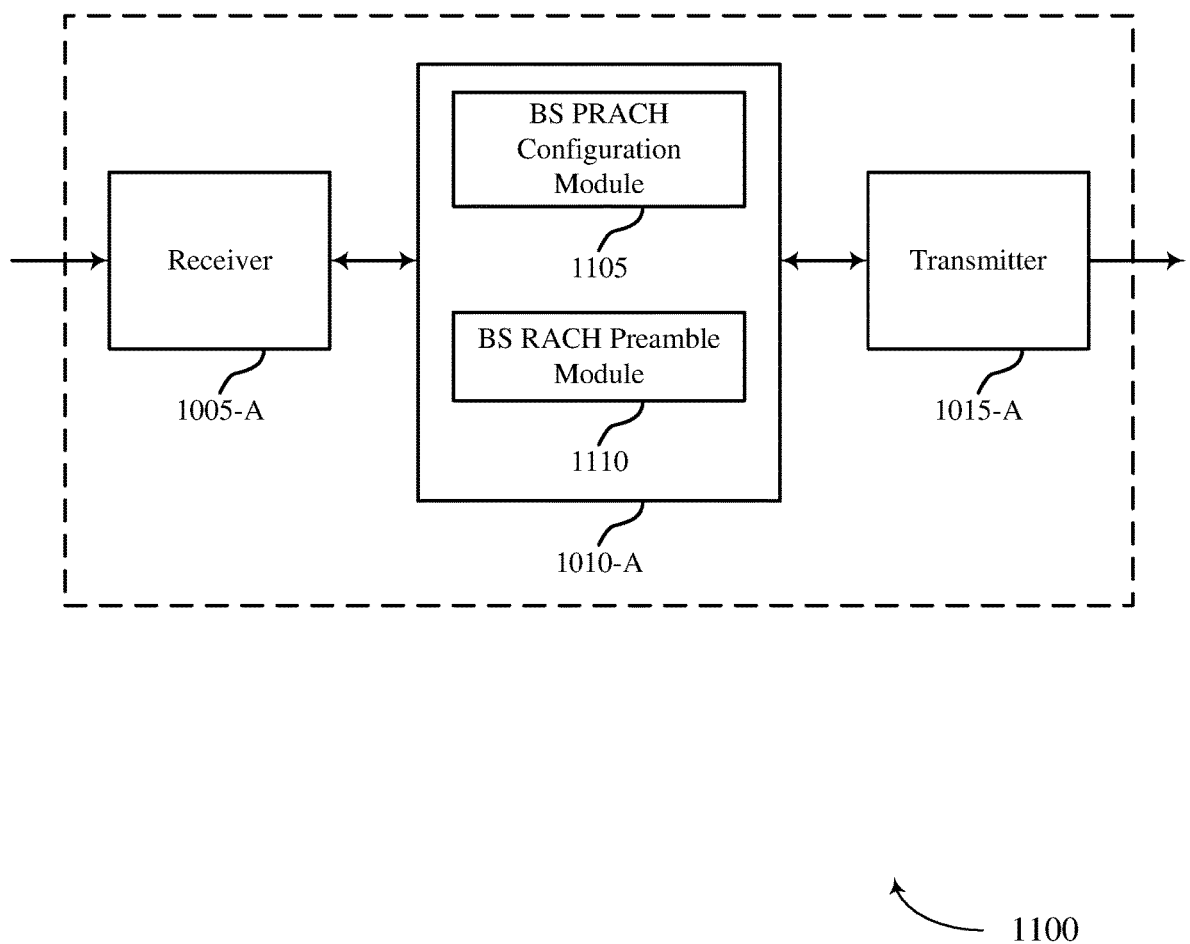

FIG. 11 shows a block diagram of a wireless device 1100 that supports random access procedures under coverage limitations in accordance with various aspects of the present disclosure. Wireless device 1100 may be an example of aspects of a wireless device 1000 or a base station 105 described with reference to FIGS. 1-10. Wireless device 1100 may include a receiver 1005-*a*, a base station CE RACH module 1010-*a*, or a transmitter 1015-*a*. Wireless device 1100 may also include a processor. Each of these components may be in communication with each other. The base station CE RACH module 1010-*a* may also include a BS PRACH configuration module 1105 and a BS RACH preamble module 1110.

The receiver 1005-*a* may receive information which may be passed on to base station CE RACH module 1010-*a*, and to other components of wireless device 1100. The base station CE RACH module 1010-*a* may perform the operations described with reference to FIG. 10. The transmitter 1015-*a* may transmit signals received from other components of wireless device 1100.

The BS PRACH configuration module 1105 may transmit signaling indicative of a set of PRACH configurations, and each PRACH configuration of the set may correspond to a supported coverage enhancement level as described with reference to FIGS. 2-5.

The BS RACH preamble module 1110 may receive a random access message according to a PRACH configuration of the set of PRACH configurations as described with reference to FIGS. 2-5.

Figure 12:
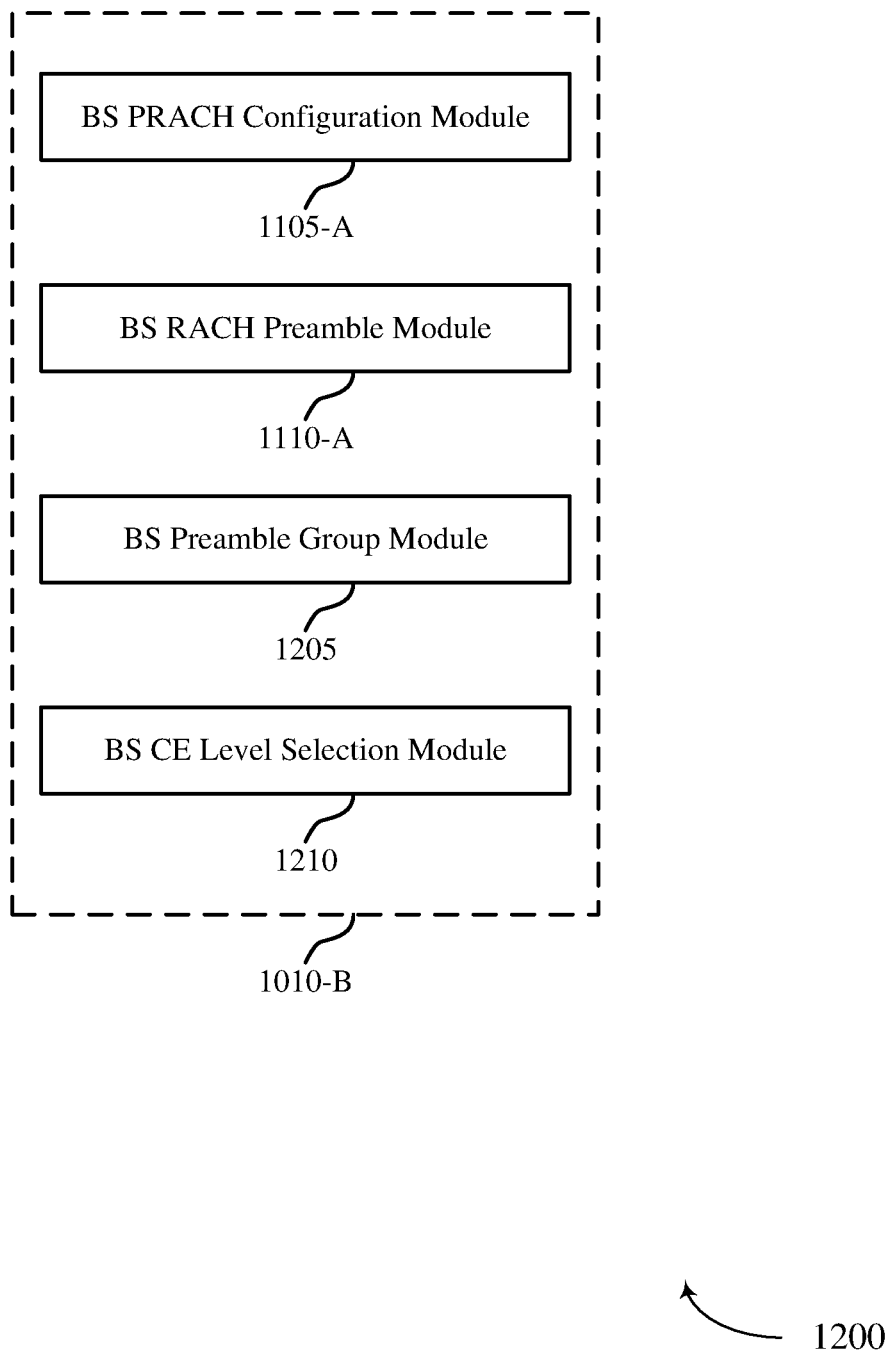

FIG. 12 shows a block diagram 1200 of a base station CE RACH module 1010-*b* which may be a component of a wireless device 1000 or a wireless device 1100 for random access procedures under coverage limitations in accordance with various aspects of the present disclosure. The base station CE RACH module 1010-*b* may be an example of aspects of a base station CE RACH module 1010 described with reference to FIGS. 10-11. The base station CE RACH module 1010-*b* may include a BS PRACH configuration module 1105-*a*, a BS RACH preamble module 1110-*a*, a BS preamble group module 1205-*a*, and a BS CE level selection module 1210-*a*. Each of these modules may perform the functions described with reference to FIG. 11. The base station CE RACH module 1010-*b* may also include a BS preamble group module 1205, and a BS CE level selection module 1210.

The BS preamble group module 1205 may transmit signaling that indicates a mapping between a DL CE level and a random access group as described with reference to FIGS. 2-5.

The BS CE level selection module 1210 may determine a DL CE level based on the random access group of the received random access message as described with reference to FIGS. 2-5.

Figure 13:
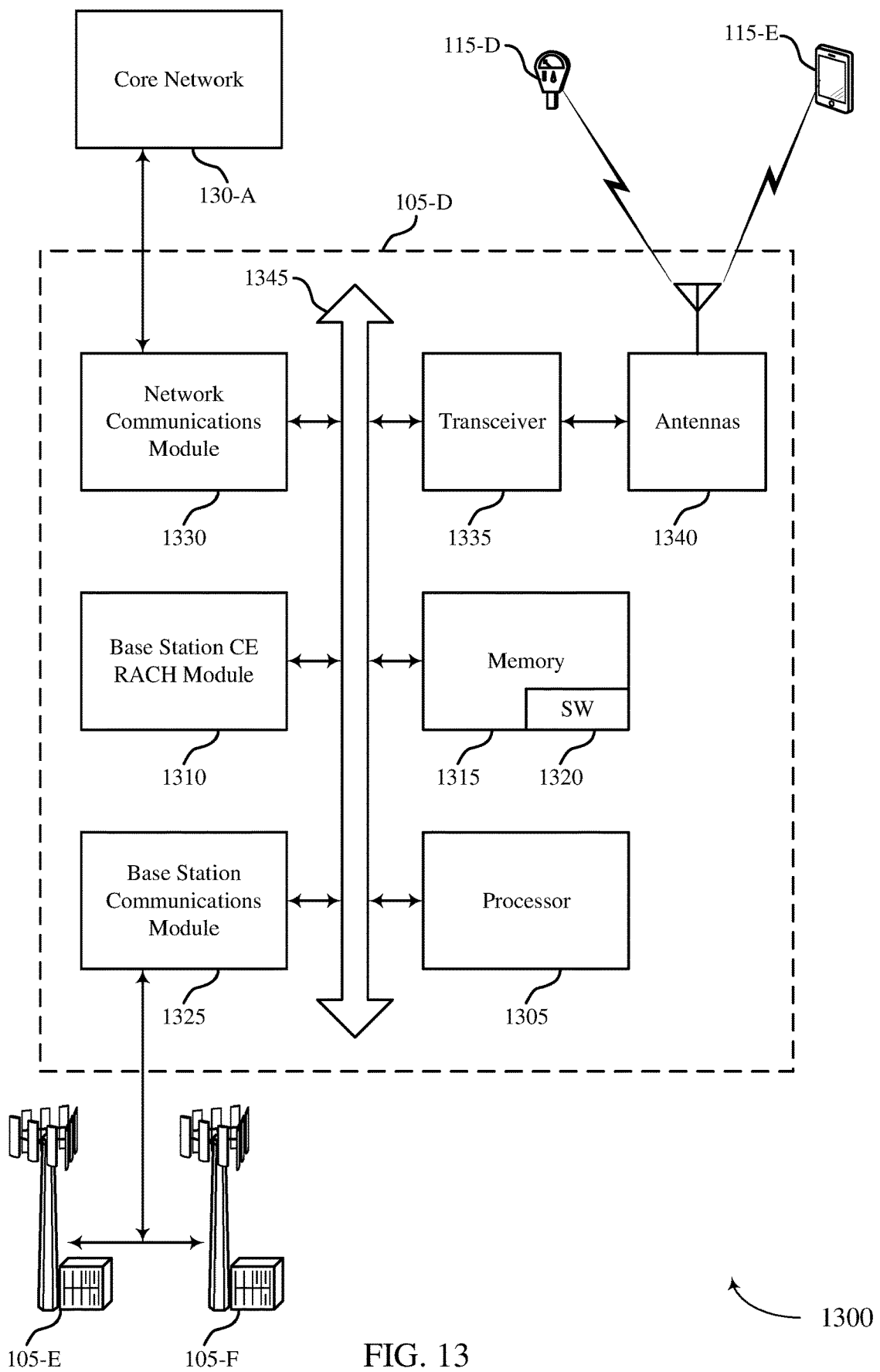
FIG. 13 illustrates a block diagram of a system including a base station that supports random access procedures under coverage limitations in accordance with various aspects of the present disclosure.

FIG. 13 shows a diagram of a system 1300 including a base station 105 that supports random access procedures under coverage limitations in accordance with various aspects of the present disclosure. System 1300 may include base station 105-*d*, which may be an example of a wireless device 1000, a wireless device 1100, or a base station 105 described with reference to FIGS. 1, 2 and 10-12. Base Station 105-*d* may include a base station CE RACH module 1310, which may be an example of a base station CE RACH module 1010 described with reference to FIGS. 10-12. Base Station 105-*d* may also include components for bi-directional voice and data communications including components for transmitting communications and components for receiving communications. For example, base station 105-*d* may communicate bi-directionally with UE 115-*d* or UE 115-*e*.

In some cases, base station 105-*d* may have one or more wired backhaul links. Base station 105-*d* may have a wired backhaul link (e.g., S1 interface, etc.) to the core network 130. Base station 105-*d* may also communicate with other base stations 105, such as base station 105-*e* and base station 105-*f* via inter-base station backhaul links (e.g., an X2 interface). Each of the base stations 105 may communicate with UEs 115 using the same or different wireless communications technologies. In some cases, base station 105-*d* may communicate with other base stations such as 105-*e* or 105-*f* utilizing base station communication module 1325. In some examples, base station communication module 1325 may provide an X2 interface within a Long Term Evolution (LTE)/LTE-A wireless communication network technology to provide communication between some of the base stations 105. In some examples, base station 105-*d* may communicate with other base stations through core network 130. In some cases, base station 105-*d* may communicate with the core network 130 through network communications module 1330.

The base station 105-*d* may include a processor 1305, memory 1315 (including software (SW) 1320), transceiver 1335, and antenna(s) 1340, which each may be in communication, directly or indirectly, with one another (e.g., over bus system 1345). The transceivers 1335 may be configured to communicate bi-directionally, via the antenna(s) 1340, with the UEs 115, which may be multi-mode devices. The transceiver 1335 (or other components of the base station 105-*d*) may also be configured to communicate bi-directionally, via the antennas 1340, with one or more other base stations (not shown). The transceiver 1335 may include a modem configured to modulate the packets and provide the modulated packets to the antennas 1340 for transmission, and to demodulate packets received from the antennas 1340. The base station 105-*d* may include multiple transceivers 1335, each with one or more associated antennas 1340. The transceiver may be an example of a combined receiver 1005 and transmitter 1015 of FIG. 10.

The memory 1315 may include RAM and ROM. The memory 1315 may also store computer-readable, computer-executable software code 1320 containing instructions that are configured to, when executed, cause the processor 1305 to perform various functions described herein (e.g., random access procedures under coverage limitations, selecting coverage enhancement techniques, call processing, database management, message routing, etc.). Alternatively, the software code 1320 (e.g., software) may not be directly executable by the processor 1305 but be configured to cause the computer, e.g., when compiled and executed, to perform functions described herein. The processor 1305 may include an intelligent hardware device, e.g., a CPU, a microcontroller, an ASIC, etc. The processor 1305 may include various special purpose processors such as encoders, queue processing modules, base band processors, radio head controllers, digital signal processors (DSP), and the like.

The base station communication module 1325 may manage communications with other base stations 105. In some cases, a communications management module may include a controller or scheduler for controlling communications with UEs 115 in cooperation with other base stations 105. For example, the base station communication module 1325 may coordinate scheduling for transmissions to UEs 115 for various interference mitigation techniques such as beamforming or joint transmission.

The components of wireless device 600, wireless device 700, CE RACH module 610, wireless device 1000, wireless device 1100, base station CE RACH module 1010, and system 1300 may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 14:
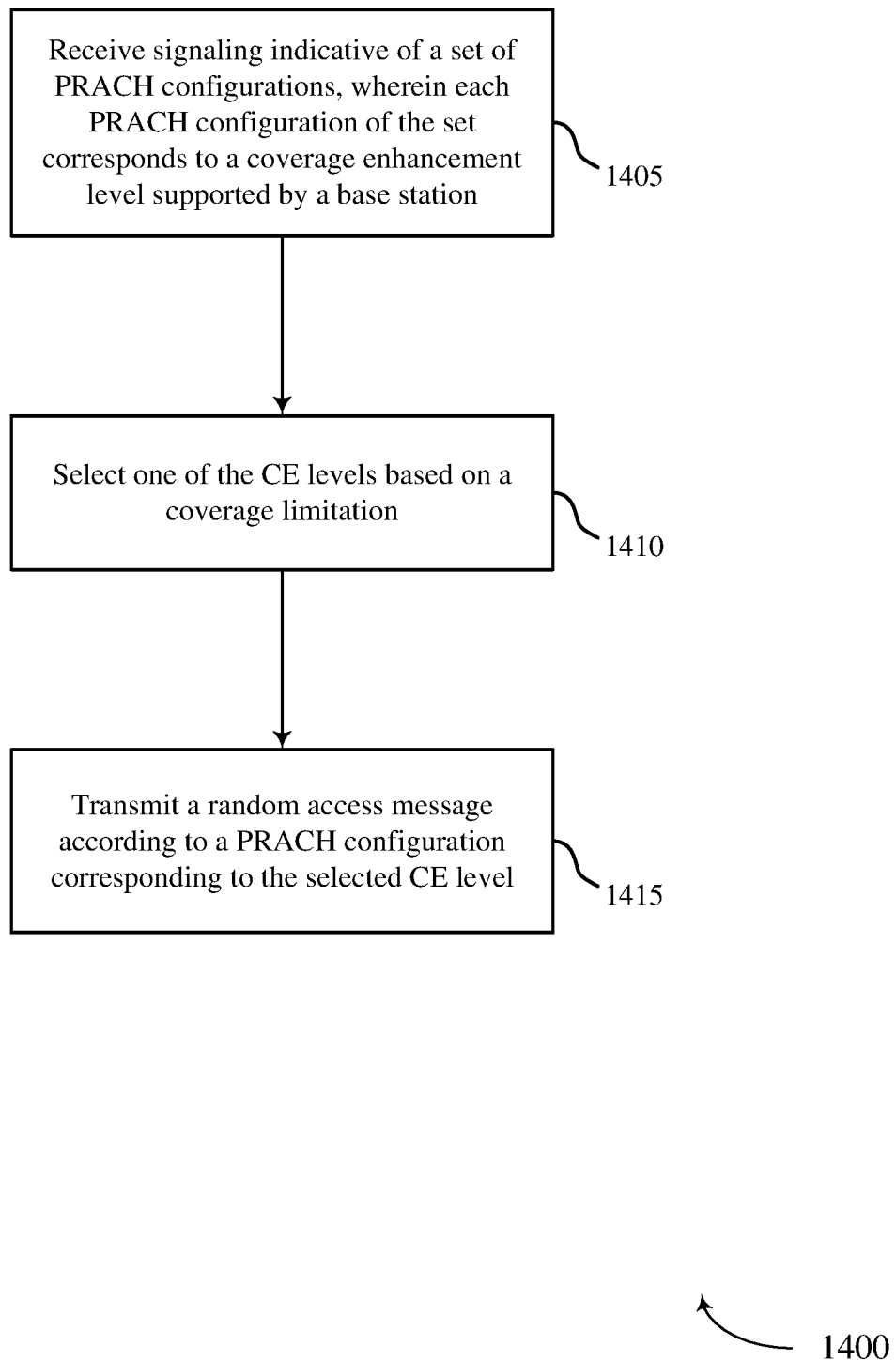
FIGS. 14 through 22 illustrate methods for random access procedures under coverage limitations in accordance with various aspects of the present disclosure.

FIG. 14 shows a flowchart illustrating a method 1400 for random access procedures under coverage limitations in accordance with various aspects of the present disclosure. The operations of method 1400 may be implemented by a UE 115 or its components as described with reference to FIGS. 1-13. For example, the operations of method 1400 may be performed by the CE RACH module 610 as described with reference to FIGS. 6-9. In some examples, a UE 115 may execute a set of codes to control the functional elements of the UE 115 to perform the functions described below. Additionally or alternatively, the UE 115 may perform aspects the functions described below using special-purpose hardware.

At block 1405, the UE 115 may receive signaling indicative of a set of PRACH configurations, and each PRACH configuration of the set may correspond to a coverage enhancement level supported by a base station as described with reference to FIGS. 2-5. In certain examples, the operations of block 1405 may be performed by the PRACH configuration module 705 as described with reference to FIG. 7.

At block 1410, the UE 115 may select one of the CE levels based at least in part on a coverage limitation as described with reference to FIGS. 2-5. In certain examples, the operations of block 1410 may be performed by the CE level selection module 710 as described with reference to FIG. 7.

At block 1415, the UE 115 may transmit a random access message according to a PRACH configuration corresponding to the selected CE level as described with reference to FIGS. 2-5. In certain examples, the operations of block 1415 may be performed by the RACH preamble module 715 as described with reference to FIG. 7.

Figure 15:
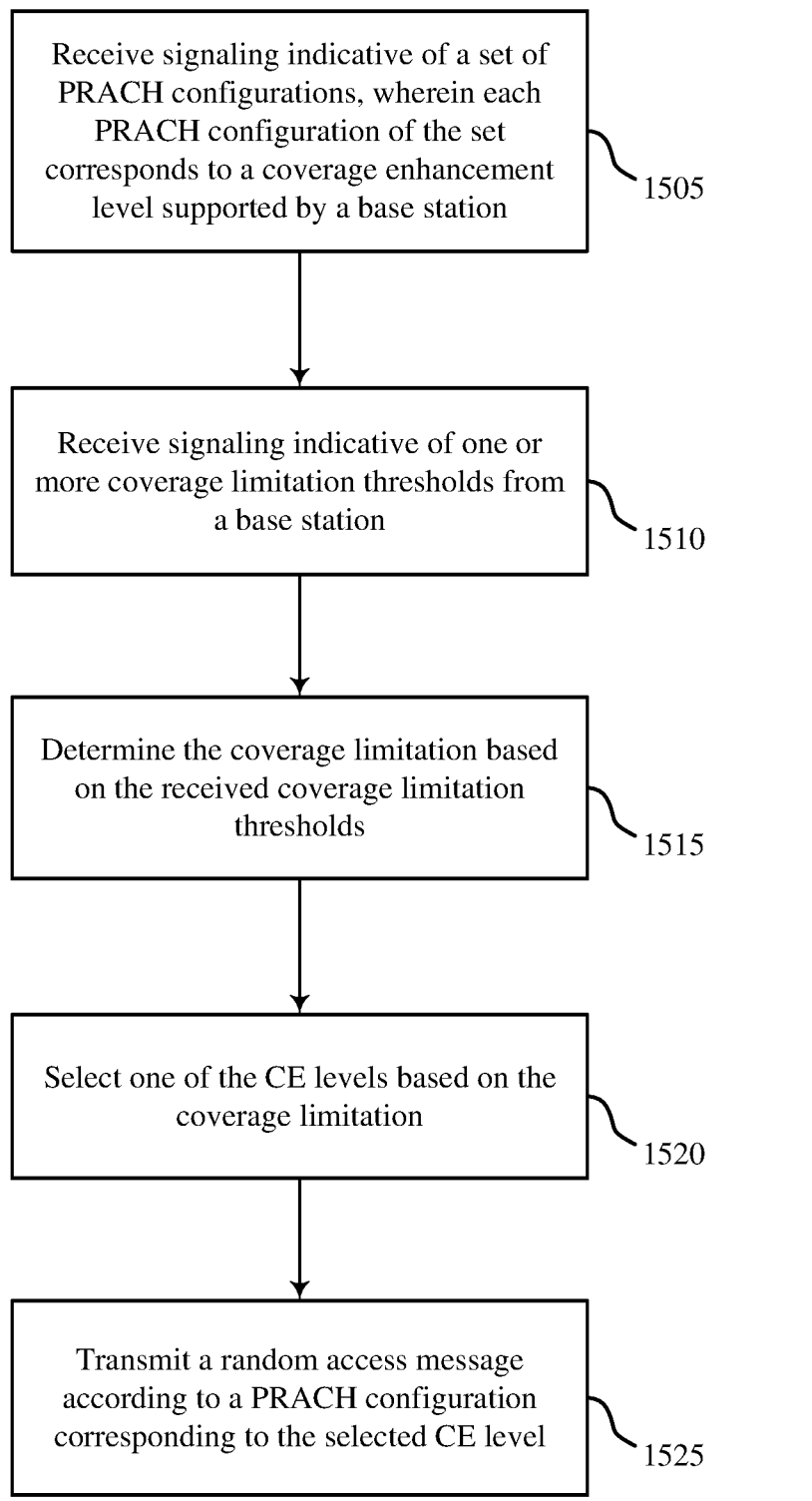

FIG. 15 shows a flowchart illustrating a method 1500 for random access procedures under coverage limitations in accordance with various aspects of the present disclosure. The operations of method 1500 may be implemented by a UE 115 or its components as described with reference to FIGS. 1-13. For example, the operations of method 1500 may be performed by the CE RACH module 610 as described with reference to FIGS. 6-9. In some examples, a UE 115 may execute a set of codes to control the functional elements of the UE 115 to perform the functions described below. Additionally or alternatively, the UE 115 may perform aspects the functions described below using special-purpose hardware. The method 1500 may also incorporate aspects of method 1400 of FIG. 14.

At block 1505, the UE 115 may receive signaling indicative of a set of PRACH configurations; each PRACH configuration of the set may correspond to a coverage enhancement level supported by a base station as described with reference to FIGS. 2-5. In certain examples, the operations of block 1505 may be performed by the PRACH configuration module 705 as described with reference to FIG. 7.

At block 1510, the UE 115 may receive signaling indicative of one or more coverage limitation thresholds from the base station as described with reference to FIGS. 2-5. In certain examples, the operations of block 1510 may be performed by the coverage limitation module 805 as described with reference to FIG. 8.

At block 1515, the UE 115 may determine a coverage limitation based at least in part on the received coverage limitation thresholds as described with reference to FIGS. 2-5. In certain examples, the operations of block 1515 may be performed by the coverage limitation module 805 as described with reference to FIG. 8.

At block 1520, the UE 115 may select one of the CE levels based at least in part on the coverage limitation as described with reference to FIGS. 2-5. In certain examples, the operations of block 1520 may be performed by the CE level selection module 710 as described with reference to FIG. 7.

At block 1525, the UE 115 may transmit a random access message according to a PRACH configuration corresponding to the selected CE level as described with reference to FIGS. 2-5. In certain examples, the operations of block 1525 may be performed by the RACH preamble module 715 as described with reference to FIG. 7.

Figure 16:
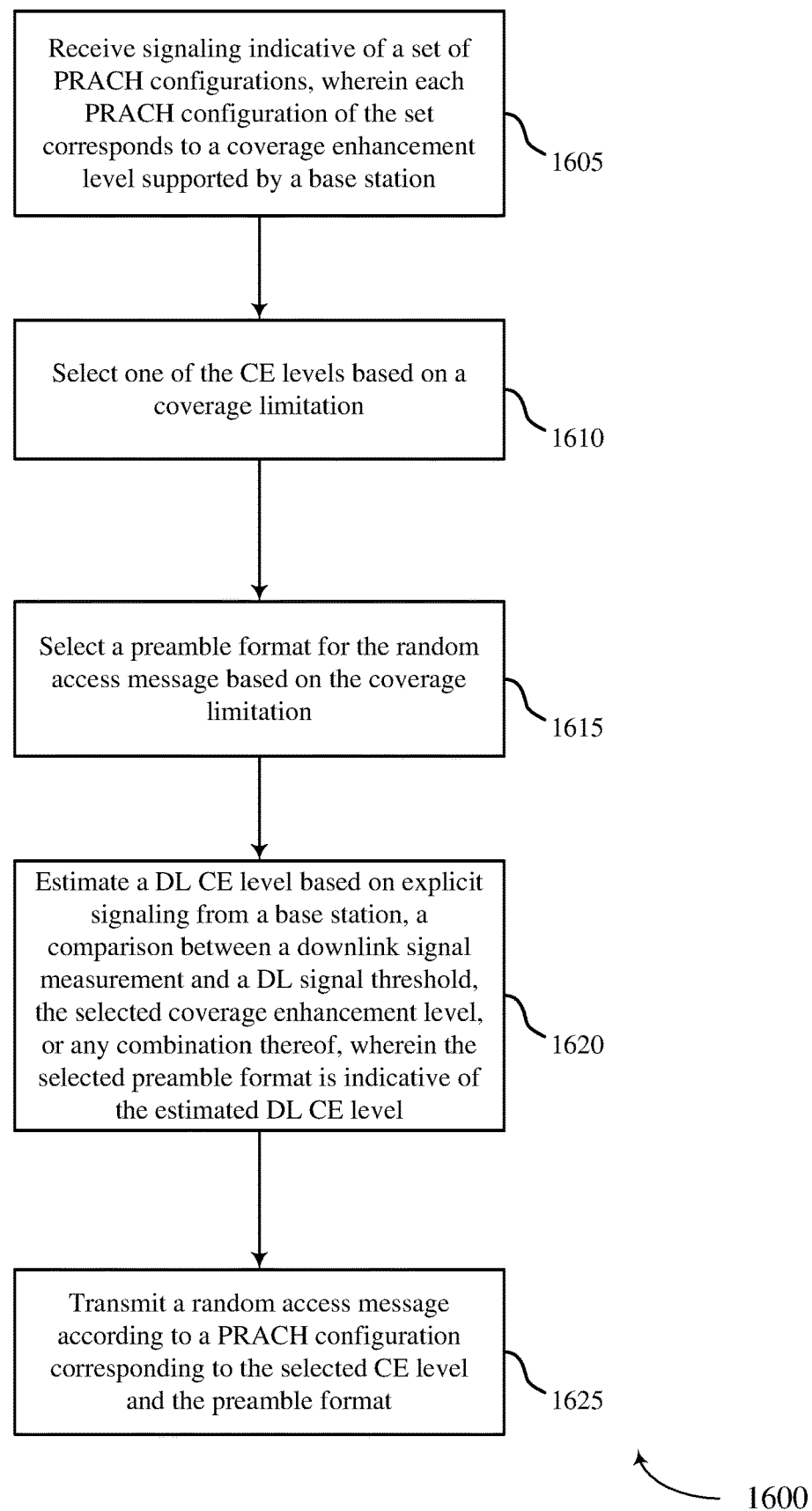

FIG. 16 shows a flowchart illustrating a method 1600 for random access procedures under coverage limitations in accordance with various aspects of the present disclosure. The operations of method 1600 may be implemented by a UE 115 or its components as described with reference to FIGS. 1-13. For example, the operations of method 1600 may be performed by the CE RACH module 610 as described with reference to FIGS. 6-9. In some examples, a UE 115 may execute a set of codes to control the functional elements of the UE 115 to perform the functions described below. Additionally or alternatively, the UE 115 may perform aspects the functions described below using special-purpose hardware. The method 1600 may also incorporate aspects of methods 1400, and 1500 of FIGS. 14-15.

At block 1605, the UE 115 may receive signaling indicative of a set of PRACH configurations; each PRACH configuration of the set may correspond to a coverage enhancement level supported by a base station as described with reference to FIGS. 2-5. In certain examples, the operations of block 1605 may be performed by the PRACH configuration module 705 as described with reference to FIG. 7.

At block 1610, the UE 115 may select one of the CE levels based at least in part on a coverage limitation as described with reference to FIGS. 2-5. In certain examples, the operations of block 1610 may be performed by the CE level selection module 710 as described with reference to FIG. 7.

At block 1615, the UE 115 may select a preamble format for the random access message based at least in part on the coverage limitation as described with reference to FIGS. 2-5. In certain examples, the operations of block 1615 may be performed by the RACH preamble module 715 as described with reference to FIG. 7.

At block 1620, the UE 115 may estimate a DL CE level based on explicit signaling from the base station, a comparison between a downlink signal measurement and a DL signal threshold, or the selected coverage enhancement level, and the selected preamble format may be indicative of the estimated DL CE level as described with reference to FIGS. 2-5. In certain examples, the operations of block 1620 may be performed by the CE level estimation module 810 as described with reference to FIG. 8.

At block 1625, the UE 115 may transmit a random access message according to a PRACH configuration corresponding to the selected CE level as described with reference to FIGS. 2-5. In certain examples, the operations of block 1625 may be performed by the RACH preamble module 715 as described with reference to FIG. 7.

Figure 17:
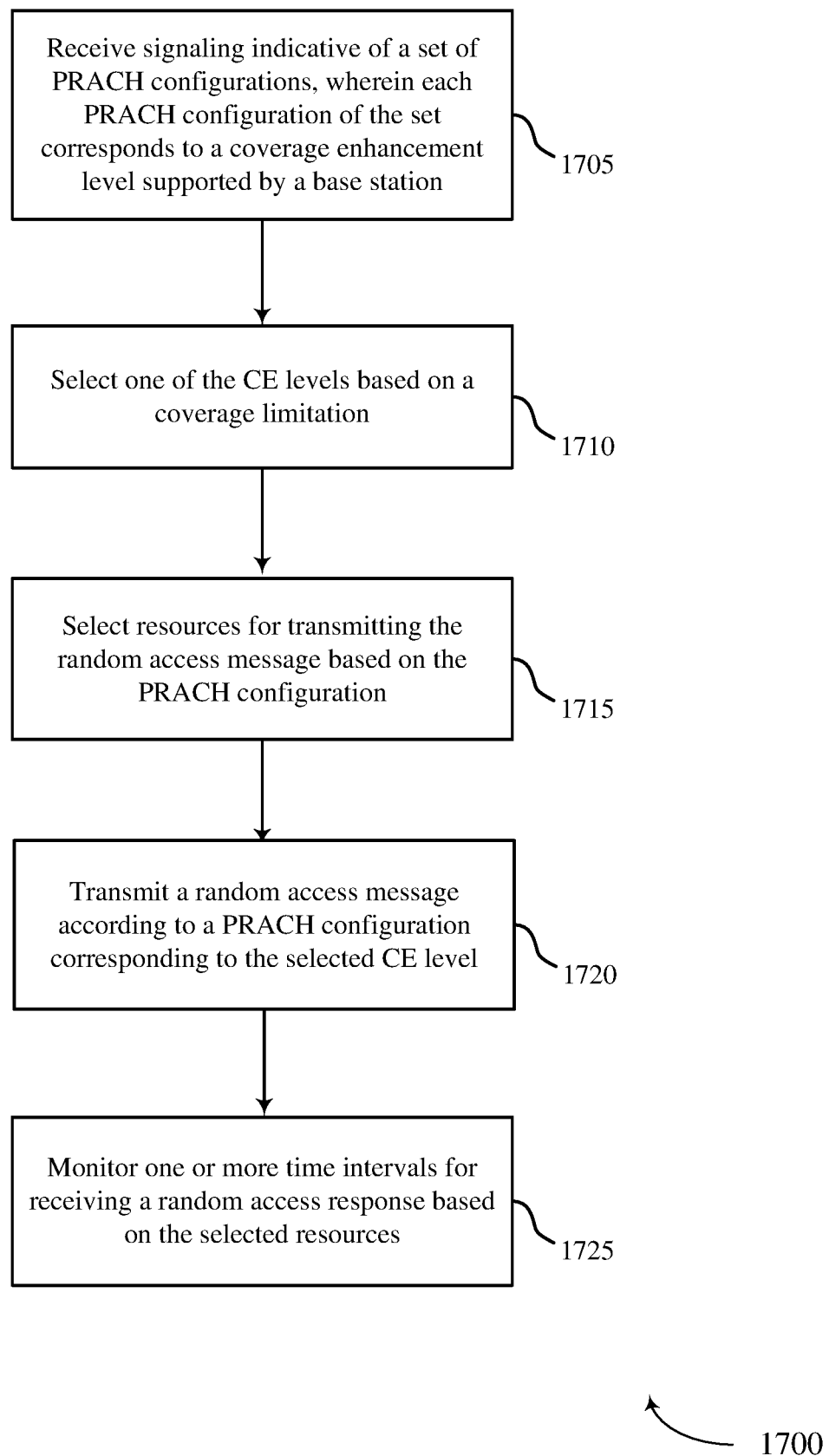

FIG. 17 shows a flowchart illustrating a method 1700 for random access procedures under coverage limitations in accordance with various aspects of the present disclosure. The operations of method 1700 may be implemented by a UE 115 or its components as described with reference to FIGS. 1-13. For example, the operations of method 1700 may be performed by the CE RACH module 610 as described with reference to FIGS. 6-9. In some examples, a UE 115 may execute a set of codes to control the functional elements of the UE 115 to perform the functions described below. Additionally or alternatively, the UE 115 may perform aspects the functions described below using special-purpose hardware. The method 1700 may also incorporate aspects of methods 1400, 1500, and 1600 of FIGS. 14-16.

At block 1705, the UE 115 may receive signaling indicative of a set of PRACH configurations, and each PRACH configuration of the set may correspond to a coverage enhancement level supported by a base station as described with reference to FIGS. 2-5. In certain examples, the operations of block 1705 may be performed by the PRACH configuration module 705 as described with reference to FIG. 7.

At block 1710, the UE 115 may select one of the CE levels based at least in part on a coverage limitation as described with reference to FIGS. 2-5. In certain examples, the operations of block 1710 may be performed by the CE level selection module 710 as described with reference to FIG. 7.

At block 1715, the UE 115 may select resources for transmitting the random access message based at least in part on the PRACH configuration as described with reference to FIGS. 2-5. In certain examples, the operations of block 1715 may be performed by the resource selection module 830 as described with reference to FIG. 8.

At block 1720, the UE 115 may transmit a random access message according to a PRACH configuration corresponding to the selected CE level as described with reference to FIGS. 2-5. In certain examples, the operations of block 1720 may be performed by the RACH preamble module 715 as described with reference to FIG. 7.

At block 1725, the UE 115 may monitor one or more pre-defined time intervals for receiving a RAR based at least in part on the selected resources as described with reference to FIGS. 2-5. In certain examples, the operations of block 1725 may be performed by the monitoring module 820 as described with reference to FIG. 8.

Figure 18:
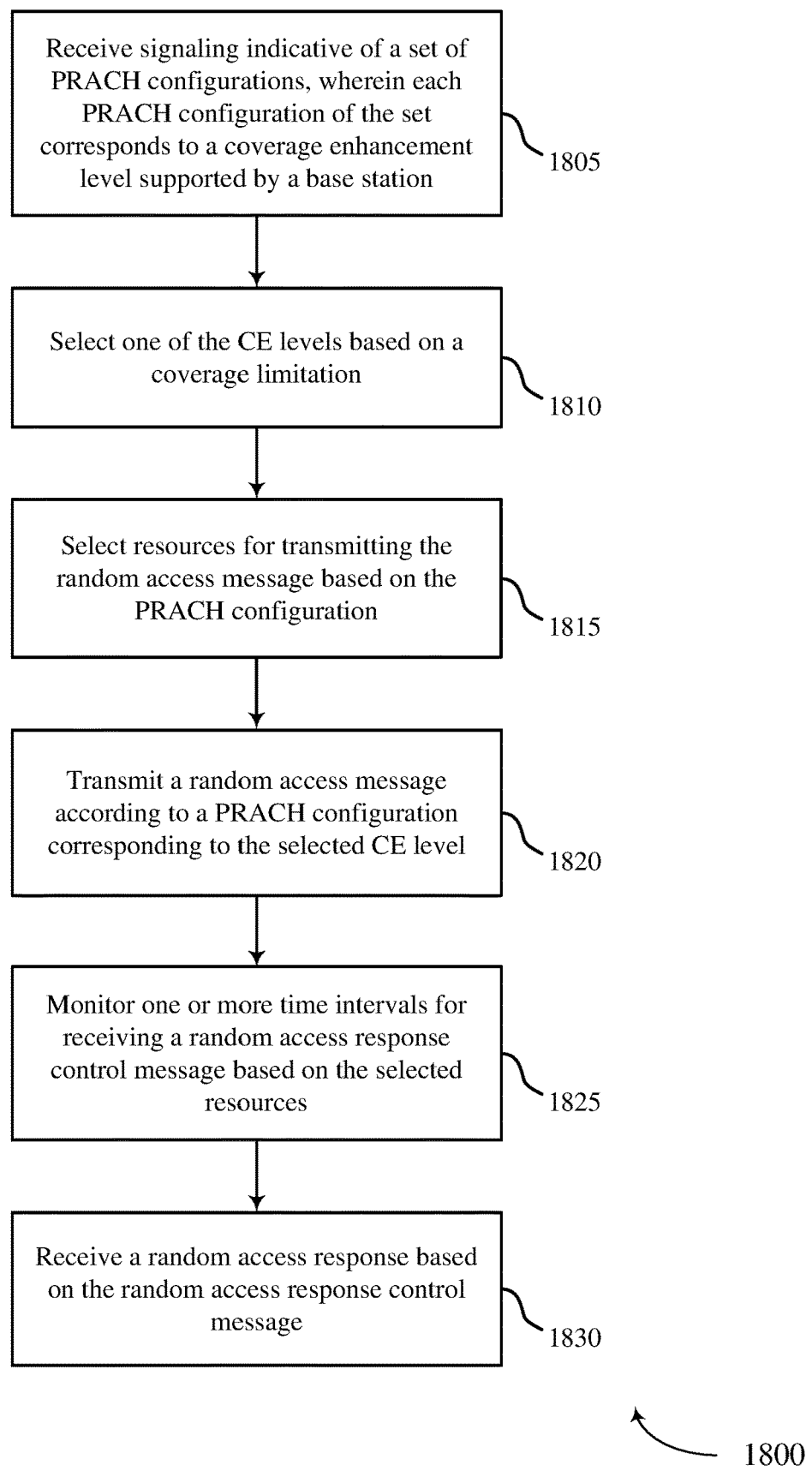

FIG. 18 shows a flowchart illustrating a method 1800 for random access procedures under coverage limitations in accordance with various aspects of the present disclosure. The operations of method 1800 may be implemented by a UE 115 or its components as described with reference to FIGS. 1-13. For example, the operations of method 1800 may be performed by the CE RACH module 610 as described with reference to FIGS. 6-9. In some examples, a UE 115 may execute a set of codes to control the functional elements of the UE 115 to perform the functions described below. Additionally or alternatively, the UE 115 may perform aspects the functions described below using special-purpose hardware. The method 1800 may also incorporate aspects of methods 1400, 1500, 1600, and 1700 of FIGS. 14-17.

At block 1805, the UE 115 may receive signaling indicative of a set of PRACH configurations; each PRACH configuration of the set may correspond to a coverage enhancement level supported by a base station as described with reference to FIGS. 2-5. In certain examples, the operations of block 1805 may be performed by the PRACH configuration module 705 as described with reference to FIG. 7.

At block 1810, the UE 115 may select one of the CE levels based at least in part on a coverage limitation as described with reference to FIGS. 2-5. In certain examples, the operations of block 1810 may be performed by the CE level selection module 710 as described with reference to FIG. 7.

At block 1815, the UE 115 may select resources for transmitting the random access message based at least in part on the PRACH configuration as described with reference to FIGS. 2-5. In certain examples, the operations of block 1815 may be performed by the resource selection module 830 as described with reference to FIG. 8.

At block 1820, the UE 115 may transmit a random access message according to a PRACH configuration corresponding to the selected CE level as described with reference to FIGS. 2-5. In certain examples, the operations of block 1820 may be performed by the RACH preamble module 715 as described with reference to FIG. 7.

At block 1825, the UE 115 may monitor one or more pre-defined time intervals for receiving a RAR control message based at least in part on the selected resources as described with reference to FIGS. 2-5. In certain examples, the operations of block 1825 may be performed by the monitoring module 820 as described with reference to FIG. 8.

At block 1830, the UE 115 may receive a RAR based at least in part on the RAR control message as described with reference to FIGS. 2-5. In certain examples, the operations of block 1830 may be performed by the receiver 605 as described with reference to FIG. 6.

Figure 19:
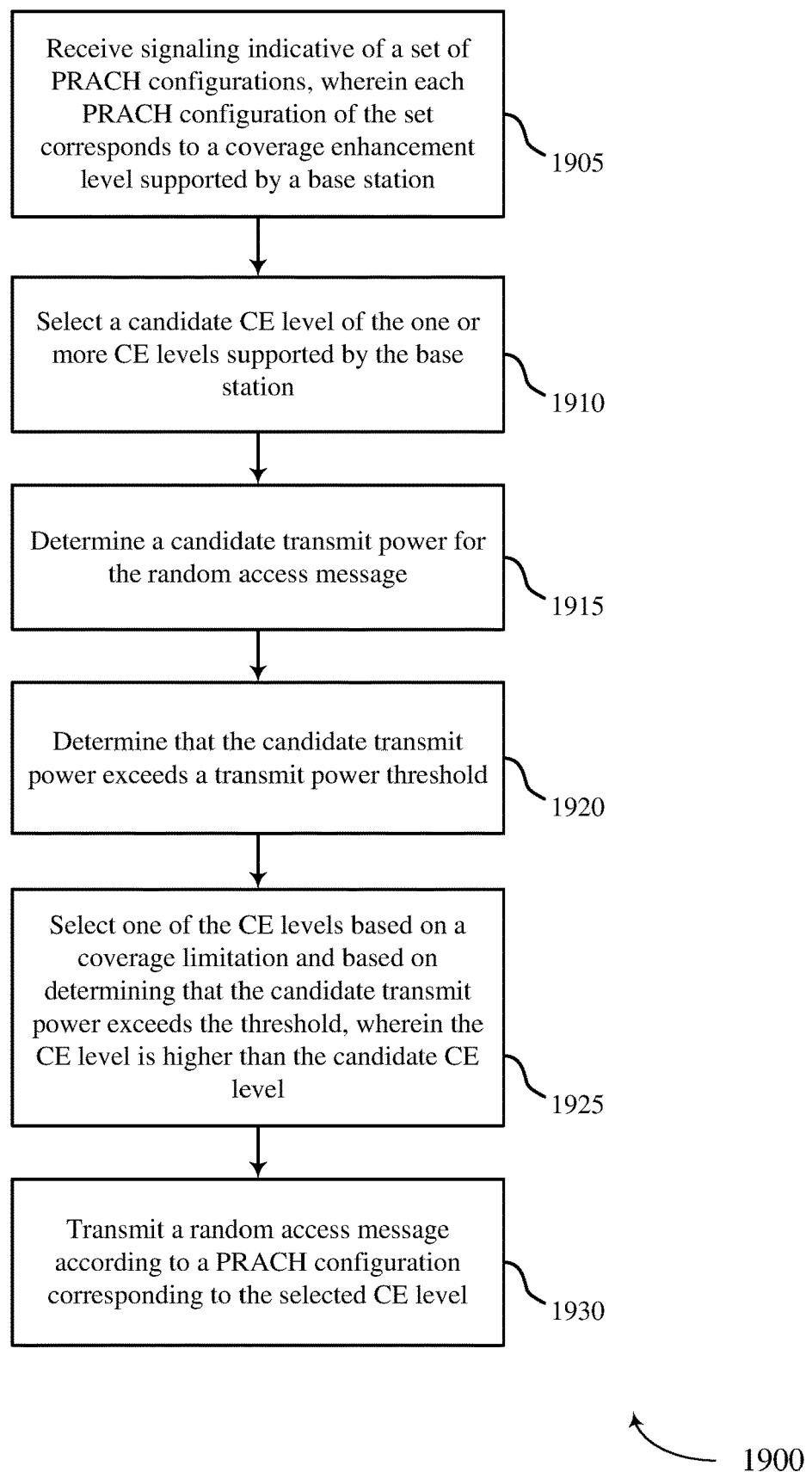

FIG. 19 shows a flowchart illustrating a method 1900 for random access procedures under coverage limitations in accordance with various aspects of the present disclosure. The operations of method 1900 may be implemented by a UE 115 or its components as described with reference to FIGS. 1-13. For example, the operations of method 1900 may be performed by the CE RACH module 610 as described with reference to FIGS. 6-9. In some examples, a UE 115 may execute a set of codes to control the functional elements of the UE 115 to perform the functions described below. Additionally or alternatively, the UE 115 may perform aspects the functions described below using special-purpose hardware. The method 1900 may also incorporate aspects of methods 1400, 1500, 1600, 1700, and 1800 of FIGS. 14-18.

At block 1905, the UE 115 may receive signaling indicative of a set of PRACH configurations; each PRACH configuration of the set may correspond to a coverage enhancement level supported by a base station as described with reference to FIGS. 2-5. In certain examples, the operations of block 1905 may be performed by the PRACH configuration module 705 as described with reference to FIG. 7.

At block 191, the UE 115 may select a candidate CE level of the one or more CE levels supported by the base station as described with reference to FIGS. 2-5. In certain examples, the operations of block 1910 may be performed by the CE level selection module 710 as described with reference to FIG. 7.

At block 1915, the UE 115 may determine a candidate transmit power for the random access message as described with reference to FIGS. 2-5. In certain examples, the operations of block 1925 may be performed by the transmit power module 835 as described with reference to FIG. 8.

At block 1920, the UE 115 may determine that the candidate transmit power exceeds a transmit power threshold as described with reference to FIGS. 2-5. In certain examples, the operations of block 1920 may be performed by the transmit power module 835 as described with reference to FIG. 8.

At block 1925, the UE 115 may select one of the CE levels based at least in part on a coverage limitation as described with reference to FIGS. 2-5. In some cases, the selection of the CE level is based at least in part on determining that the candidate transmit power exceeds the threshold, and the CE level may be higher than the candidate CE level. In certain examples, the operations of block 1925 may be performed by the CE level selection module 710 as described with reference to FIG. 7.

At block 1930, the UE 115 may transmit a random access message according to a PRACH configuration corresponding to the selected CE level as described with reference to FIGS. 2-5. In certain examples, the operations of block 1930 may be performed by the RACH preamble module 715 as described with reference to FIG. 7.

Figure 20:
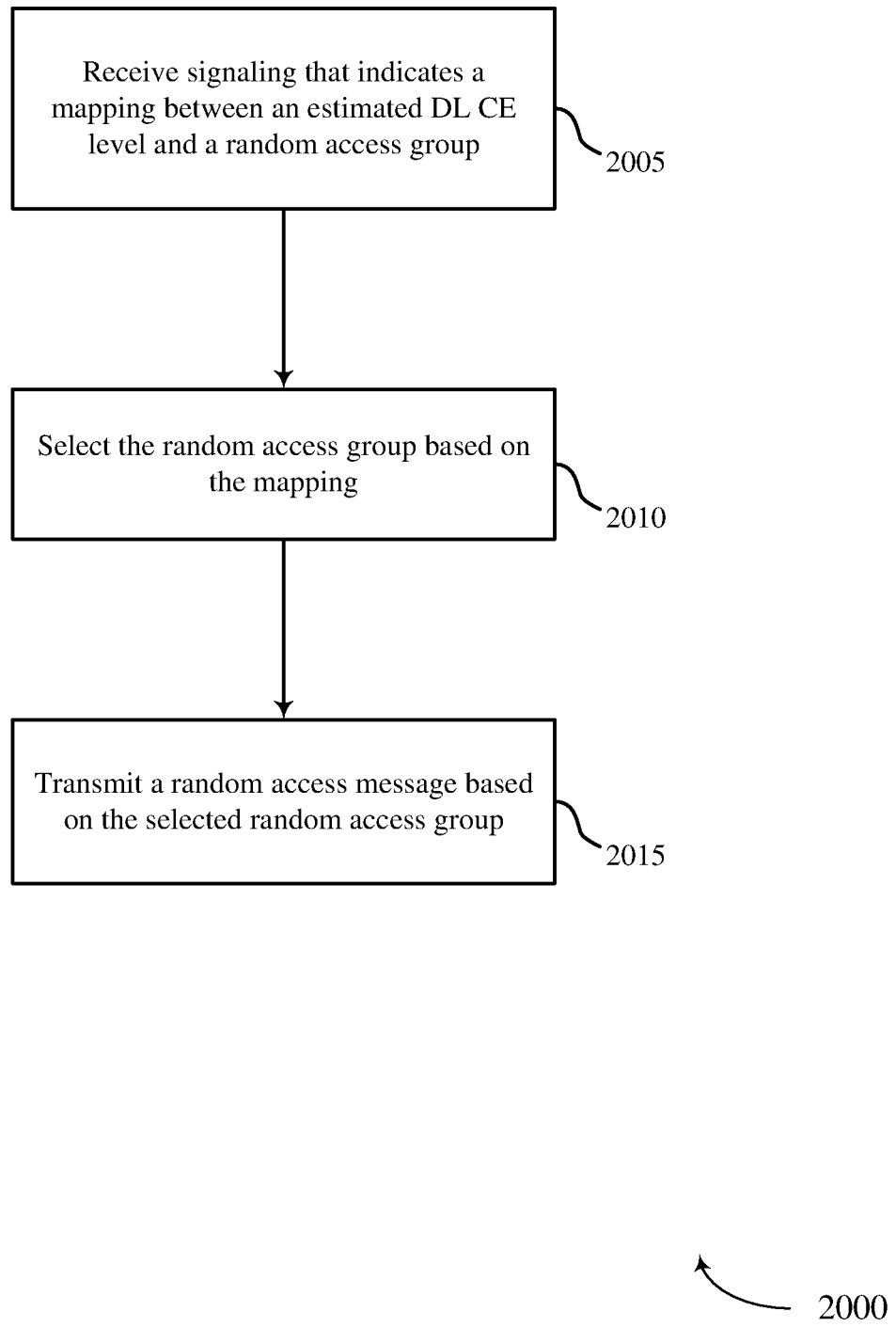

FIG. 20 shows a flowchart illustrating a method 2000 for random access procedures under coverage limitations in accordance with various aspects of the present disclosure. The operations of method 2000 may be implemented by a UE 115 or its components as described with reference to FIGS. 1-13. For example, the operations of method 2000 may be performed by the CE RACH module 610 as described with reference to FIGS. 6-9. In some examples, a UE 115 may execute a set of codes to control the functional elements of the UE 115 to perform the functions described below. Additionally or alternatively, the UE 115 may perform aspects the functions described below using special-purpose hardware. The method 2000 may also incorporate aspects of methods 1400, 1500, 1600, 1700, 1800, and 1900 of FIGS. 14-19.

At block 2005, the UE 115 may receive signaling that indicates a mapping between an estimated DL CE level and a random access group as described with reference to FIGS. 2-5. In certain examples, the operations of block 2005 may be performed by the preamble group module 855 as described with reference to FIG. 8.

At block 2010, the UE 115 may select the random access group based at least in part on the mapping as described with reference to FIGS. 2-5. In certain examples, the operations of block 2010 may be performed by the preamble group module 855 as described with reference to FIG. 8.

At block 2015, the UE 115 may transmit a random access message based at least in part on the selected random access group as described with reference to FIGS. 2-5. In certain examples, the operations of block 2015 may be performed by the RACH preamble module 715 as described with reference to FIG. 7.

Figure 21:
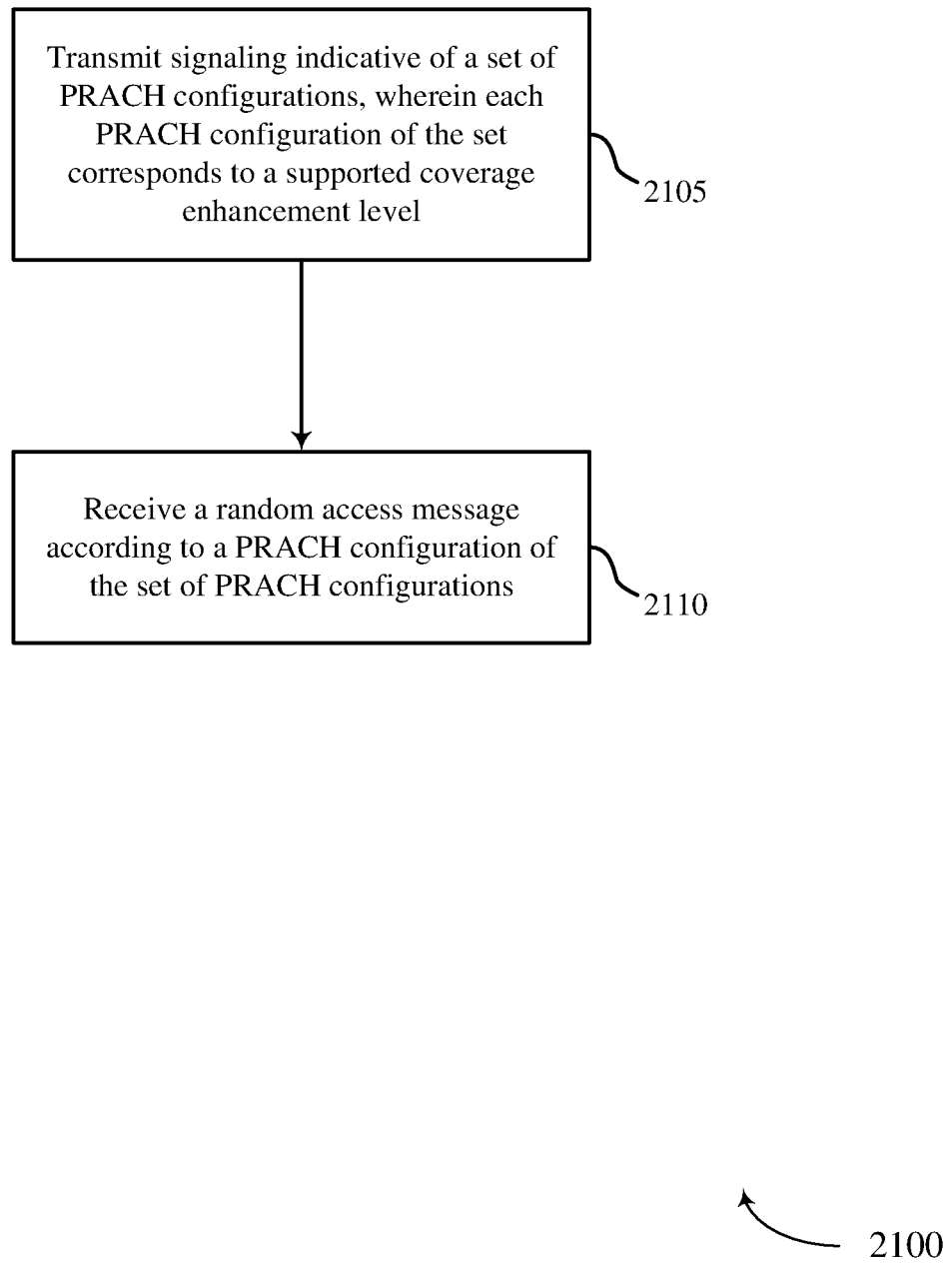

FIG. 21 shows a flowchart illustrating a method 2100 for random access procedures under coverage limitations in accordance with various aspects of the present disclosure. The operations of method 2100 may be implemented by a base station 105 or its components as described with reference to FIGS. 1-13. For example, the operations of method 2100 may be performed by the base station CE RACH module 1010 as described with reference to FIGS. 10-13. In some examples, a base station 105 may execute a set of codes to control the functional elements of the base station 105 to perform the functions described below. Additionally or alternatively, the base station 105 may perform aspects the functions described below using special-purpose hardware.

At block 2105, the base station 105 may transmit signaling indicative of a set of PRACH configurations, and each PRACH configuration of the set may correspond to a supported coverage enhancement level as described with reference to FIGS. 2-5. In certain examples, the operations of block 2105 may be performed by the BS PRACH configuration module 1105 as described with reference to FIG. 11.

At block 2110, the base station 105 may receive a random access message according to a PRACH configuration of the set of PRACH configurations as described with reference to FIGS. 2-5. In certain examples, the operations of block 2110 may be performed by the BS RACH preamble module 1110 as described with reference to FIG. 11.

Figure 22:
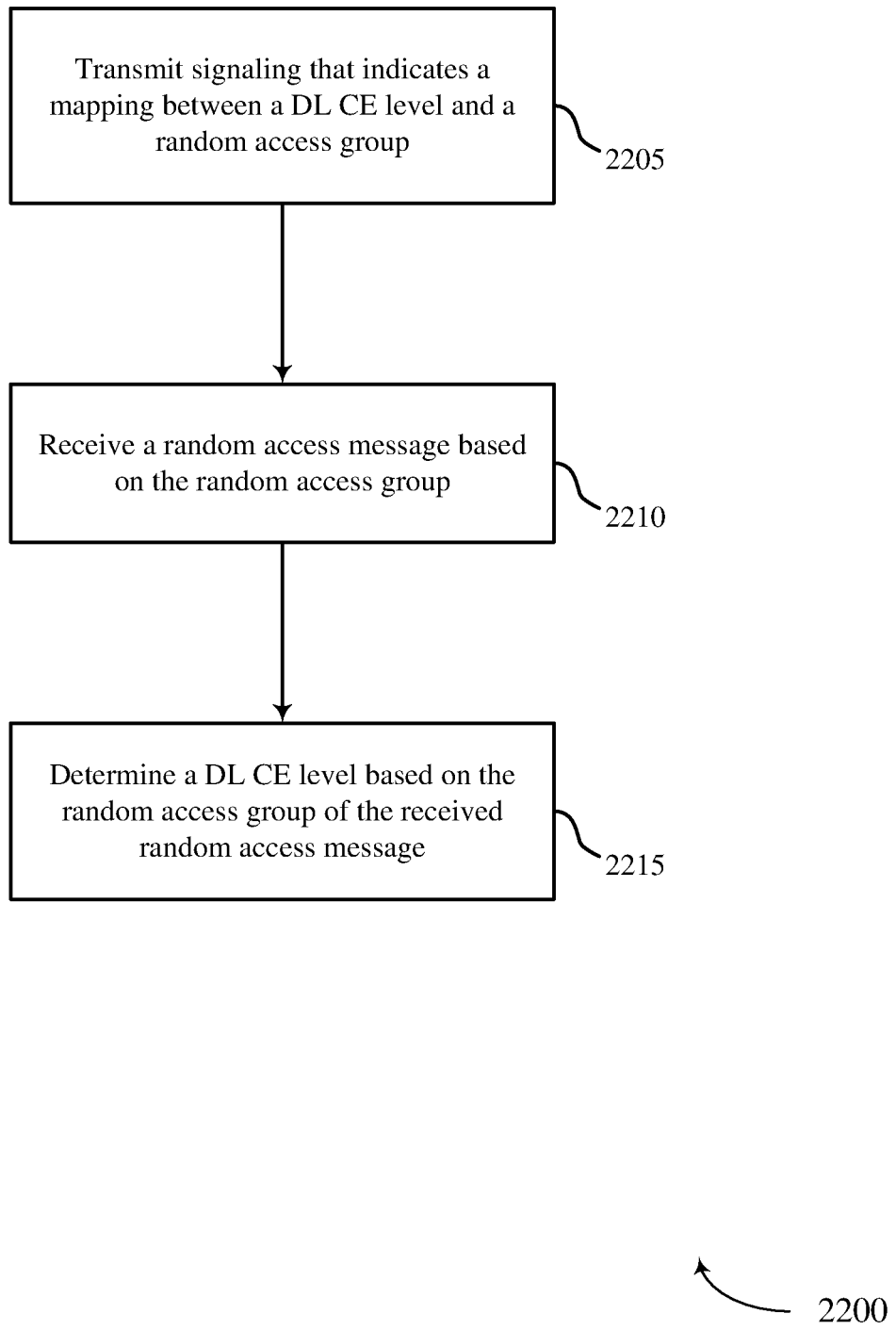

FIG. 22 shows a flowchart illustrating a method 2200 for random access procedures under coverage limitations in accordance with various aspects of the present disclosure. The operations of method 2200 may be implemented by a base station 105 or its components as described with reference to FIGS. 1-13. For example, the operations of method 2200 may be performed by the base station CE RACH module 1010 as described with reference to FIGS. 10-13. In some examples, a base station 105 may execute a set of codes to control the functional elements of the base station 105 to perform the functions described below. Additionally or alternatively, the base station 105 may perform aspects the functions described below using special-purpose hardware. The method 2200 may also incorporate aspects of method 2100 of FIG. 21.

At block 2205, the base station 105 may transmit signaling that indicates a mapping between a DL CE level and a random access group as described with reference to FIGS. 2-5. In certain examples, the operations of block 2205 may be performed by the BS preamble group module 1205 as described with reference to FIG. 11.

At block 2210, the base station 105 may receive a random access message based at least in part on the random access group as described with reference to FIGS. 2-5. In certain examples, the operations of block 2210 may be performed by the RACH preamble module 715 as described with reference to FIG. 7.

At block 2215, the base station 105 may determine a DL CE level based at least in part on the random access group of the received random access message as described with reference to FIGS. 2-5. In certain examples, the operations of block 2215 may be performed by the BS CE level selection module 1210 as described with reference to FIG. 11.

Thus, methods 1400, 1500, 1600, 1700, 1800, 1900, 2000, 2100, and 2200 may provide for random access procedures under coverage limitations. It should be noted that methods 1400, 1500, 1600, 1700, 1800, 1900, 2000, 2100, and 2200 describe possible implementation, and that the operations and the steps may be rearranged or otherwise modified such that other implementations are possible. In some examples, aspects from two or more of the methods 1400, 1500, 1600, 1700, 1800, 1900, 2000, 2100, and 2200 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-advanced (LTE-a) are new releases of Universal Mobile Telecommunications System (UMTS) that use E-UTRA. UTRA, E-UTRA, Universal Mobile Telecommunications System (UMTS), LTE, LTE-a, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including such networks as described herein, the term evolved node B (eNB) may be generally used to describe the base stations. The wireless communications system or systems described herein may include a heterogeneous LTE/LTE-A network in which different types of evolved node Bs (eNB s) provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or TDD operation (e.g., using unpaired spectrum resources). Frame structures may be defined for FDD (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication at a base station, comprising:
    transmitting signaling indicative of a set of physical random access channel (PRACH) configurations, wherein each PRACH configuration of the set of PRACH configurations corresponds to one of a plurality of coverage enhancement (CE) levels supported by the base station; and
    receiving a random access message according to a PRACH configuration of the set of PRACH configurations, the random access message comprising a preamble of a preamble group associated with a first CE level, the preamble group indicative of the first CE level which is selected by a user equipment and the PRACH configuration corresponding to a second CE level, wherein the preamble group is one of a plurality of preamble groups each corresponding to a respective one of a second plurality of CE levels; and
    determining the first CE level based at least in part on the preamble group associated with the first CE level.

2. The method of claim 1, further comprising:
    transmitting signaling indicative of one or more coverage limitation thresholds, wherein the random access message is received based at least in part on the signaling.

3. The method of claim 2, wherein the second CE level is selected from the plurality of CE levels for uplink transmissions based at least in part on the one or more coverage limitation thresholds.

4. The method of claim 1, further comprising:
    transmitting a random access response based at least in part on the random access message.

5. The method of claim 1, further comprising:
    transmitting an indication in a random access response to continue monitoring for one or more further response messages.

6. The method of claim 1, further comprising:
    selecting resources for transmitting a random access response based at least in part on the PRACH configuration; and
    transmitting the random access response using the selected resources.

7. The method of claim 1, further comprising:
    transmitting signaling indicative of a CE level, wherein the random access message is received based at least in part on the indicated CE level.

8. The method of claim 1, wherein the first CE level is a downlink CE level supported by the base station and the second CE level is an uplink CE level supported by the base station.

9. The method of claim 1, further comprising:
    selecting the first CE level for downlink communications based at least in part on the preamble group of the received random access message.

10. The method of claim 1, wherein the first CE level is based at least in part on the second CE level.

11. A method of wireless communication, comprising:
    transmitting signaling that indicates a mapping between a coverage enhancement (CE) level and a random access group;
    receiving a random access message associated with the random access group based at least in part on the mapping between the CE level and the random access group; and
    determining a CE level for a random access response based at least in part on the mapping and the random access group of the received random access message.

12. An apparatus for wireless communication at a base station, comprising: a processor; memory coupled with the processor; and instructions stored in the memory and operable, when executed by the processor, to cause the apparatus to:

transmit signaling indicative of a set of physical random access channel (PRACH) configurations, wherein each PRACH configuration of the set of PRACH configurations corresponds to one of a plurality of coverage enhancement (CE) levels supported by the base station;

receive a random access message according to a PRACH configuration of the set of PRACH configurations, the random access message comprising a preamble of a preamble group associated with a first CE level, the preamble group indicative of the first CE level which is selected by a user equipment and the PRACH configuration corresponding to a second CE level, wherein the preamble group is one of a plurality of preamble groups each corresponding to a respective one of a second plurality of CE levels; and determine the first CE level based at least in part on the preamble group association with the first CE level.

13. The apparatus of claim 12, wherein the instructions are operable to cause the apparatus to:

transmit signaling indicative of one or more coverage limitation thresholds, wherein the random access message is received based at least in part on the signaling.

14. The apparatus of claim 12, wherein the instructions are operable to cause the apparatus to:

transmit a random access response based at least in part on the random access message.

15. The apparatus of claim 12, wherein the instructions are operable to cause the apparatus to:

transmit an indication in a random access response to continue monitoring for one or more further response messages.

16. The apparatus of claim 12, wherein the instructions are operable to cause the apparatus to:

transmit signaling indicative of a CE level, wherein the random access message is received based at least in part on the indicated CE level.

17. An apparatus for wireless communication, comprising: a processor; memory coupled with the processor; and instructions stored in the memory and operable, when executed by the processor, to cause the apparatus to:

transmit signaling that indicates a mapping between a coverage enhancement (CE) level and a random access group;

receive a random access message associated with the random access group based at least in part on the mapping between the CE level and the random access group; and determine a CE level for a random access response based at least in part on the mapping and the random access group of the received random access message.

* * * * *